United States Patent
Wang et al.

(10) Patent No.: US 10,817,279 B1
(45) Date of Patent: Oct. 27, 2020

(54) PROVIDING DIFFERENT UPGRADE PATHS FOR UPGRADING A SERVER

(71) Applicant: EMC IP Holding Company LLC, Hopkinton, MA (US)

(72) Inventors: Ren Wang, Shanghai (CN); James Morton, Adamstown, MD (US); Scott Randolph Quesnelle, Burlington (CA); Lihui Su, Shanghai (CN); Ming Zhang, Shanghai (CN); Jiayang Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/386,112

(22) Filed: Apr. 16, 2019

(51) Int. Cl.
*G06F 9/445* (2018.01)
*G06F 8/65* (2018.01)
*H04L 29/08* (2006.01)
*G06F 8/71* (2018.01)

(52) U.S. Cl.
CPC .................. *G06F 8/65* (2013.01); *G06F 8/71* (2013.01); *H04L 67/34* (2013.01)

(58) Field of Classification Search
CPC .............. G06F 8/65; G06F 8/71; H04L 67/34
See application file for complete search history.

(56) References Cited

U.S. PATENT DOCUMENTS

| 9,383,989 | B1 * | 7/2016 | Qi ............................. G06F 8/65 |
| 2005/0132350 | A1 * | 6/2005 | Markley ................... G06F 8/65 717/168 |
| 2014/0013318 | A1 * | 1/2014 | Rychikhin ............... G06F 8/65 717/172 |
| 2017/0371650 | A1 * | 12/2017 | Li ............................ G06F 8/71 |

* cited by examiner

*Primary Examiner* — Lewis A Bullock, Jr.
*Assistant Examiner* — Tina Huynh
(74) *Attorney, Agent, or Firm* — Staniford Tomita LLP

(57) ABSTRACT

First and second types of weighted values are assigned to graph edges of a directed acyclic graph representing versions of a software product. The first type of weighted values indicate a degree of stability associated with upgrading the product. The second type of weighted values indicate an estimated time for the upgrading. A first upgrade path through the graph is generated using the first type of weighted values and corresponds to a first upgrade plan that minimizes risks associated with the upgrade. A second upgrade path through the graph is generated using the second type of weighted values and corresponds to a second upgrade plan that minimizes the estimated upgrade time. An upgrade package is created for one of the first or second upgrade plans. The upgrade package includes the desired version, intermediate versions, and a sequence indicating an order in which the intermediate versions should be installed.

12 Claims, 15 Drawing Sheets

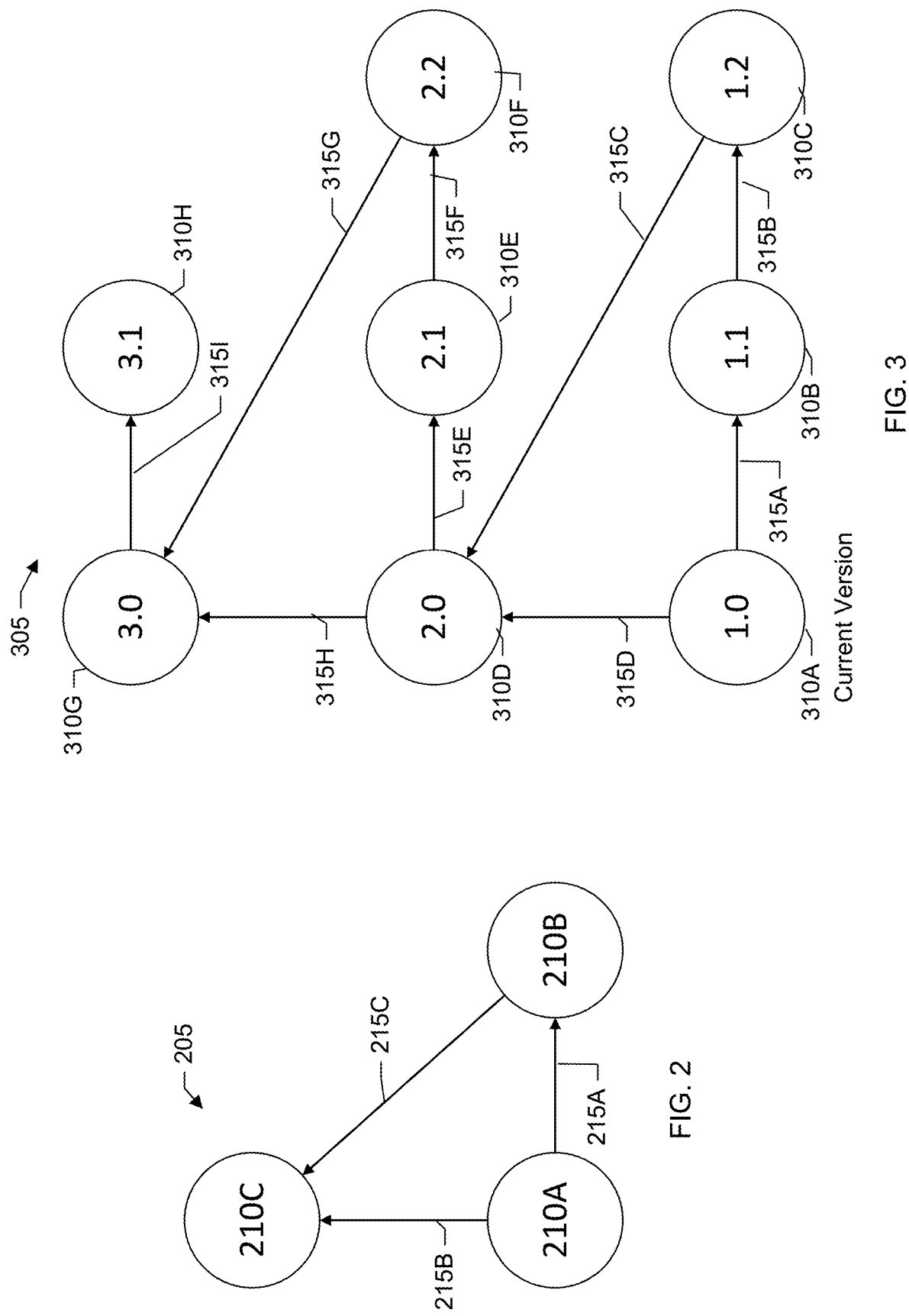

```
┌─────────────────────────────────────────────────────────────────────┐
│   Build a directed acyclic graph including a set nodes and a set of │
│   edges, each node representing a version of a software product,    │
│   and each edge representing an upgrade path between a pair of nodes│
│                                 410                                 │
└─────────────────────────────────────────────────────────────────────┘
                                   │
                                   ▼
┌─────────────────────────────────────────────────────────────────────┐
│  Assign sets of weighted values of first and second types to the    │
│  set of edges, the first type of weighted value indicating a degree │
│  of stability associated with upgrading an earlier version of the   │
│  software to a later version, and the second type of weighted value │
│  indicating an estimated time required to upgrade the earlier       │
│  version to the later version                                       │
│                                 415                                 │
└─────────────────────────────────────────────────────────────────────┘
                                   │
                                   ▼
┌─────────────────────────────────────────────────────────────────────┐
│  Generate, using the first type of weighted values, a first upgrade │
│  path through the graph to a node representing a desired version of │
│  the software to upgrade to, the first upgrade path corresponding   │
│  to a first upgrade plan that minimizes risks associated with       │
│  upgrading to the desired version                                   │
│                                 420                                 │
└─────────────────────────────────────────────────────────────────────┘
                                   │
                                   ▼
┌─────────────────────────────────────────────────────────────────────┐
│  Generate, using the second type of weighted values, a second       │
│  upgrade path through the graph to the node representing the        │
│  desired version, the second upgrade path corresponding to a second │
│  upgrade plan that minimizes an estimated upgrade time associated   │
│  with the upgrading to the desired version                          │
│                                 425                                 │
└─────────────────────────────────────────────────────────────────────┘
                                   │
                                   ▼
┌─────────────────────────────────────────────────────────────────────┐
│          Prompt the user to select the first or second upgrade plan │
│                                 430                                 │
└─────────────────────────────────────────────────────────────────────┘
                                   │
                                   ▼
┌─────────────────────────────────────────────────────────────────────┐
│  Create, responsive to the user selection, an upgrade package for   │
│  the first or second upgrade plan, the upgrade package including    │
│  the desired version, at least a subset of intermediate versions of │
│  the software product, and a sequence indicating an order in which  │
│  the intermediate versions should be installed                      │
│                                 435                                 │
└─────────────────────────────────────────────────────────────────────┘
                                   │
                                   ▼
┌─────────────────────────────────────────────────────────────────────┐
│              Transmit the upgrade package to the user               │
│                                 440                                 │
└─────────────────────────────────────────────────────────────────────┘
```

FIG. 4

Example of the
Stable Edge

Example of the Stable Node

Example of the
Time Cost Edge $$\text{Weight} = f(x) = \begin{cases} 1, & x \geq 0 \text{ and } x < 10 \\ 2, & x \geq 10 \text{ and } x < 30 \\ 3, & x \geq 30 \text{ and } x < 60 \\ 10, & x \geq 60 \text{ and } x < 180 \\ 30, & x \geq 180 \end{cases}$$

x = the time cost, in minutes.

FIG. 9

$$W_{path} = \sum_{i=1}^{n} w_i$$

$w_i$: the weight of the edge i of the path

FIG. 10

Example of the
Time Cost Edge

Most Stable Plan

PROVIDING DIFFERENT UPGRADE PATHS FOR UPGRADING A SERVER

CROSS-REFERENCE TO RELATED APPLICATIONS

This patent application is related to U.S. patent application Ser. No. 16/386,442 filed Apr. 17, 2019, which is incorporated by reference along with all other references cited herein.

TECHNICAL FIELD

The present invention relates generally to information processing systems, and more particularly, to systems and techniques for upgrading software.

BACKGROUND

Typically, developers of a software product will release many different versions of the software product over its lifecycle. These new versions may offer new features not available or found in previous versions, bug fixes, security updates, improved performance, and so forth. When a new version is released, end-user customers may not necessarily immediately upgrade to the new version. For example, the customer may determine that they have no immediate need for the new features or inadvertently neglect to perform the upgrade. At some point, however, the customer may decide that they wish to upgrade the current version of the software product they have installed on their computing devices to some later version of the software product.

In the intervening time, there may have been many different releases of the software product that the customer has not installed. Proceeding with the upgrade can be a difficult, time-consuming, and laborious process for the customer because of the many different versions that may be available.

There is need for improved systems and techniques to manage the upgrade process.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 2 shows an example of a directed acyclic graph, according to one or more embodiments.

FIG. 3 shows another example of a directed acyclic graph, according to one or more embodiments.

FIG. 4 shows an overall flow for using a directed acyclic graph to model software upgrades, according to one or more embodiments.

FIG. 9 shows a function for assigning edge weights, according to one or more embodiments.

FIG. 10 shows a function for summing edge weights of upgrade paths, according to one or more embodiments.

DETAILED DESCRIPTION

Figure 1:
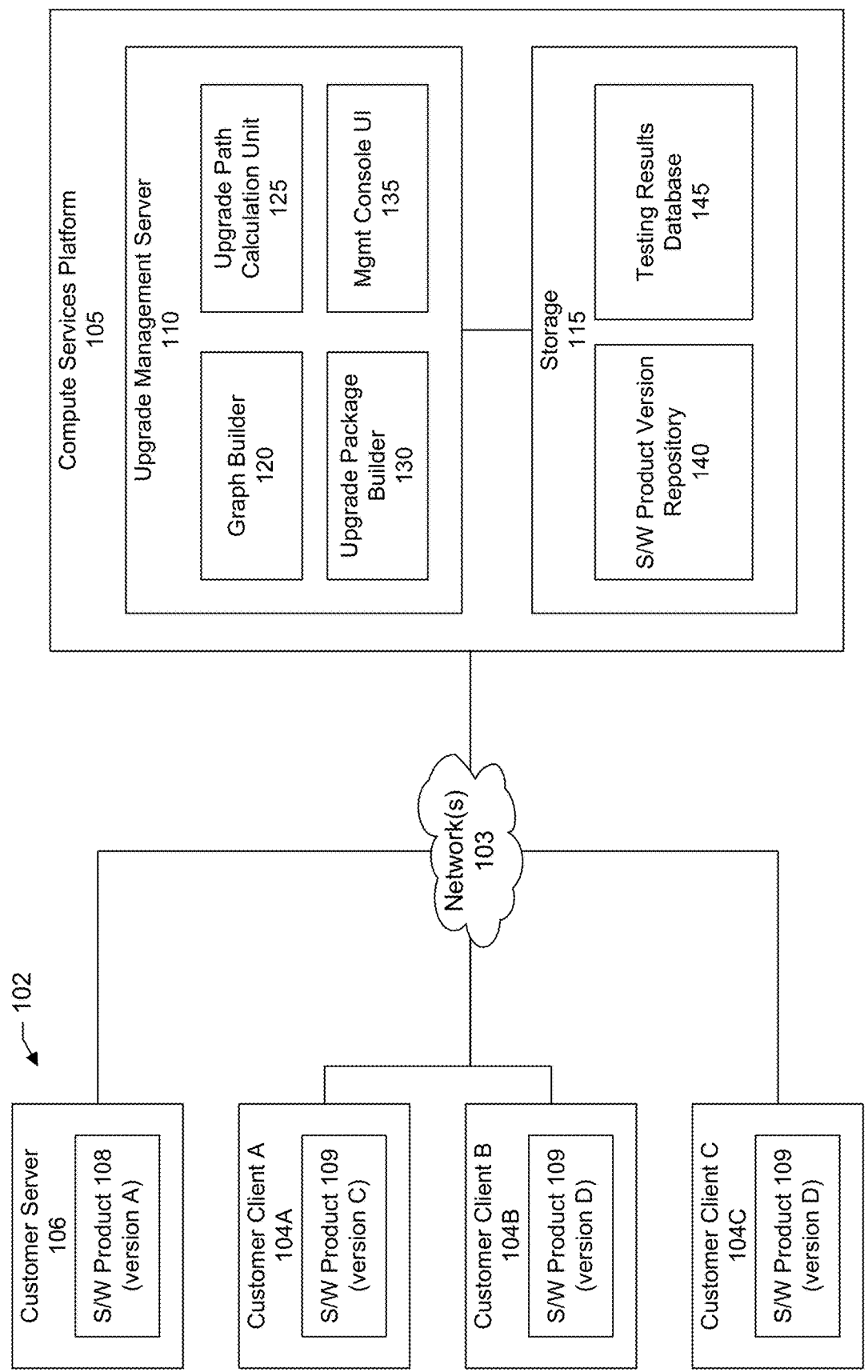
FIG. 1 shows a block diagram of an information processing system for generating upgrade plans, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for assisting a user with an upgrade of a software product installed on a computing device such as a server or client computer. An upgrade of a software product may involve changes to source code of the software product. In a product life cycle, there will be many major and minor versions of the product released. Upgrading software from one specific version to another may have many possible upgrade paths, with certain key versions and releases. Some paths may be recommended or well-tested, while other paths are not. It is desirable to provide a recommended upgrade path by leveraging an algorithm, without or with little customer involvement.

In an embodiment, systems and techniques are provided to recommend both the most stable and the quickest upgrade paths. Below is a brief summary of some customer use cases for an automatically generated upgrade plan.

1) For a server upgrade, a customer can receive upgrade path recommendations and choose an upgrade plan based on several different strategies.

2) For a client upgrade which may involve many client nodes where each client node has a different version of a software product installed, an auto generated upgrade plan can help all client nodes upgrade to a same target version without or with little user involvement.

3) In highly scalable environments, when upgrading many nodes with varying versions, an auto generated upgrade plan will allow all nodes to be upgraded to the same target version without or with little user involvement.

4) Based on the upgrade plan, upgrade packages can be prepared before upgrading or downloading from the support website.

5) Product versions can be monitored and upgrade suggestions provided.

Currently, there are no automatic upgrade solutions. Customers need to be manually involved in the upgrade process, and may upgrade from one version to another in an unexpected order. The downside of customer-controlled upgrades include customers needing to upgrade assets one by one manually, until reaching the target or latest version; and customers upgrading using a path that is not ideal or recommended, and which may have known issues.

FIG. 1 shows a block diagram of an information processing system 100 configured in accordance with an illustrative embodiment. The information processing system includes any number of customer computing devices 102. The customer computing devices communicate over a network 103 with a compute services platform 105.

The customer computing devices can include, for example, server computers (e.g., server 106), client computers (e.g., clients 104A-C), or both. Some specific examples of computing devices include workstations, desktops, laptops or tablet computers, mobile telephones, smartphones, portable communication devices, or other types of processing devices capable of communicating with compute services platform 105 over network 103.

The customer computing devices may execute or run any number of software products. In the example shown in FIG. 1, a software product 108 is installed on server 106. A software product 109 is installed on clients 104A-C. A software product may include systems software, firmware, or application software. Some specific examples of software products include operating systems, file systems, server application programs, enterprise applications, database applications, client application programs, Web browser programs, productivity programs (e.g., word processing applications, spreadsheet applications, presentation applications, video editing applications), end-user programs, software suites, and so forth.

Network 103 is assumed to comprise a portion of a global computer network such as the Internet, although other types of networks can be part of network 103, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The compute services platform includes hardware components such as a processor, memory, network interface card, storage (e.g., disk arrays), and so forth. In a specific embodiment, the compute services platform includes an upgrade management server 110 and storage 115.

The upgrade management server includes a graph builder 120, upgrade path calculation unit 125, upgrade package builder 130, and management console 135. Storage may include a software product repository 140, and a testing results database 145. It should be appreciated that the blocks, modules, and components shown in FIG. 1 may be functional and there can be many different hardware and software configurations to implement the functions described.

The graph builder is responsible for building a graph and, more particularly, a directed acyclic graph representing different versions of a software product. The graph includes a collection of nodes and edges, where the nodes are objects that are connected in pairs by edges. In the case of a directed graph, each edge has an orientation, from one node to another node. A path in a directed graph can be described by a sequence of edges having the property that the ending node of each edge in the sequence is the same as the starting node of the next edge in the sequence; a path can form a cycle if the starting node of its first edge equals the ending node of its last edge. A directed acyclic graph can be a directed graph that has no cycles. In other words, a directed acyclic graph can be a finite directed graph with no directed cycles.

The directed acyclic graph can include a finite number of nodes and edges, with each edge directed from one node to another. A node may have many different edges pointing to many other different nodes. A node may be referred to as a vertex. An edge may be referred to as an arc.

FIG. 2 shows an example of a directed acyclic graph 205. In the example of FIG. 2, the graph includes three nodes 210A-C and three edges 215A-C. First edge 215A extends from first node 210A to second node 210B. Second edge 215B extends from first node 210A to third node 210C. Third edge 215C extends from second node 210B to third node 210C. Although FIG. 2 shows three nodes and three edges, it should be appreciated that the graph is shown merely for purposes of example. A graph may include any number of nodes and any number of edges. The number nodes and the number of edges may be the same or different.

In a specific embodiment, a directed acyclic graph is used to model or represent various versions or releases of a particular software product. In this specific embodiment, each node of the graph stands for or represents a version of the software product and the edge stands for or represents an upgrade from one version to another.

For example, FIG. 3 shows a directed acyclic graph 305 having nodes 310A-H and edges 315A-315I. The graph represents a specific or single software product. Specifically, the nodes represent the versions or releases of the software product; and the edges represent the possible upgrade paths. In particular, node 310A represents version 1.0 of the software product (which may currently be installed on the customer's computing device). Node 310B represents version 1.1. Node 315C represents version 1.2. Node 315D represents version 2.0, and so forth. Edge 315A extends from or between a pair of nodes including node 310A,B. Edge 315A thus indicates that version 1.0 can be upgraded to version 1.1. Edge 315D extends from or between a pair of nodes including node 310A,D. Edge 315D thus indicates that version 1.0 can be upgraded to version 2.0 directly, thus bypassing versions 1.1 and 1.2. And so forth.

As shown in the example of FIG. 3, from any node to another node, there can be multiple possible paths, e.g., two or more paths. That is, if the customer wishes to upgrade from version 1.0 to version 3.1, there are many routes that could be chosen. For example, a first upgrade path involves upgrading from version 1.0 (node 310A) to version 2.0 (node 310D) to version 3.0 (node 310G) to version 3.1 (node 310H). A second upgrade path involves upgrading from version 1.0 (node 310A) to version 1.1 (node 310B) to version 1.2 (node 310C) to version 2.0 (node 310D) to version 3.0 (node 310G) to version 3.1 (node 310H). And so forth. An initial node in the graph may be set to correspond to a version of the software that is currently installed on the customer's computing device. A final node in the graph may be set to correspond to a desired version of the software that the customer would like the computing device be upgraded to.

Each edge is assigned a weighted numerical value. The numerical value quantifies an attribute associated with upgrading from an earlier or older version of the software product to a later or newer version of the software product. Different upgrade paths, plans, or routes through the graph may thus have different values. In particular, combining or summing the weighted values associated with a particular upgrade path provides an overall index or measurement of the attribute associated with the upgrade. Following the plan can complete the upgrade automatically.

In a specific embodiment, there are two attributes associated with the upgrade that are assessed, calculated, or measured. A first attribute indicates a level of risk or stability associated with the upgrade. A second attribute indicates an estimated amount of time required for the upgrade. In this specific embodiment, two upgrade paths are calculated. A first upgrade path minimizes the level of risk associated with the upgrade. The first upgrade path thus corresponds to an upgrade plan that is the most stable. A second upgrade path minimizes the amount of time required to complete the upgrade. The second upgrade path thus corresponds to an upgrade plan that while may not be as stable as the first upgrade path—can be completed in less time than the first upgrade path. Depending upon the user's needs, the user can choose the first upgrade path to help ensure the most stability or the second upgrade path to help ensure that the upgrade completes in the least amount of time.

There are many different types of software testing including, for example, acceptance testing, unit testing, functional testing, regression testing, performance testing, load testing, security testing, localization testing, and many others. Some tests may be assigned a higher priority than other tests. Software products generally undergo at least some level of testing before being released. Nonetheless, factors such as the complexity of modern day software products, almost infinite number of different compute environment configurations and test scenarios, market demand for new functionality, market demand for improved performance and usability, and first-mover advantages mean that virtually no release of a software product can be guaranteed to be completely bug-free.

Thus, a version release may be more or less thoroughly tested as compared to another version. In some cases of upgrade, a customer may be willing to trade stability for speed of installation. For example, if the customer plans to deploy the upgrade in a non-mission critical environment, such as an internal evaluation or test environment, the customer may accept a less stable upgrade path in exchange for a rapid install.

In other cases, however, the customer may wish to deploy the upgrade into a mission-critical or production environment. In these cases, the customer may be willing to trade speed of installation for stability. For example, in the former case, the customer may be willing to accept a risk of potential data loss, compatibility problems, loss of existing functions, and so forth in order to have the upgrade install be completed quickly. In the latter case, the customer may desire the more stable and thoroughly tested upgrade path, and accept a longer upgrade path, in order to minimize any problems with the upgrade. In an embodiment, systems and techniques provide the customer with the flexibility to choose an upgrade path that corresponds to their needs and requirements.

Referring back now to FIG. 1, the upgrade path calculation unit is responsible for identifying, iterating, and traversing each of the various upgrade paths that may be present in the directed acyclic graph created by the graph builder to calculate a level of risk and an estimated upgrade time associated with each upgrade path. The different levels of risk associated with each upgrade path can then be compared to each other to identify a particular upgrade path that minimizes the level of risk or that is the most stable among all the other potential upgrade paths present in the graph.

Likewise, the estimated upgrade time associated with each upgrade path can then be compared to each other to identify a particular upgrade path that minimizes the estimated amount of time required for the upgrade, e.g., upgrade path that requires the least amount of time as compared to all other potential upgrade paths present in the graph. A user can then select whether they'd like the upgrade path that minimizes risk (e.g., is the most stable) or the upgrade path that minimizes the estimated time required for the upgrade.

The upgrade package builder is responsible for assembling an upgrade package corresponding to the upgrade path that the user selected. In an embodiment, the upgrade package includes a desired version of the software product that the user desires to upgrade to, a set of intermediate versions of the software product, and a sequence indicating an order in which the intermediate versions of the software product should be installed on the customer's computing device. The intermediate versions of the software product refer to versions of the software product that were released after the currently installed version on the customer's computing device and before the desired version of the software product the customer wishes to upgrade to.

The management console acts as the user interface to the upgrade management server. In a specific embodiment, the two different upgrade paths are presented to the user through the management console for the user to select. The management console receives a selection of the upgrade path and informs the upgrade package builder of the selection. The upgrade package builder can then gather different intermediate or earlier versions of the software product corresponding to the selected upgrade path (along with the final desired version) and generate a set of instructions for an installer program to be included with the upgrade package that indicates an order in which the intermediate versions of the software product should be installed on the customer computing device. The final desired version may then be installed after the intermediate versions have been installed.

In another specific embodiment, the customer user can use the management console to select as a blanket or default setting for a collection of multiple computing devices whether upgrade plans should be assembled according to a most stable plan or a quickest plan. Thus, the user does not have to repeatedly and individually select a particular plan for each particular computing device.

The software product repository stores different versions of a particular software product. The repository may further include release notes corresponding to each of the different versions. The release notes may be in plain text format whereas the software product versions may be in a binary format. The upgrade package builder can fetch a subset of the different versions of the software product from the repository depending upon the upgrade path that the user selected. These different versions can then be combined into a single upgrade package, file, other container, or set of containers for the user to download. In an embodiment, the relevant release notes associated with the versions may also be included in the upgrade package. In another embodiment, the release notes for the final desired version are included in the upgrade package and other release notes for the intermediate versions may not be included in the upgrade package. Not including or omitting the release notes for the intermediate versions can help to reduce the amount of material that the user must sift through as in many cases, the release notes for the intermediate versions may be superseded by the release notes for the final desired version.

The testing results database stores results obtained from testing the various different versions of the software product. In an embodiment, the test results include a stability score and upgrade time score associated with upgrading an earlier version of the software product to a later version of the software product. These scores quantify the relationship between different versions of the software product and may be assessed by, for example, a quality assurance (QA) team of a vendor of the software product. Generally, testing a new version of a software product includes testing for compatibility with earlier versions of the software product, other software products that are likely to be found on the customer computing device, and so forth. The testing is performed to help assess risks associated with the upgrade such as loss of existing features or functions, non-compatible software products, non-compatible drivers, data loss, and so forth. The time required to upgrade to the various later versions of the software product may also be recorded in the testing results database.

In an embodiment, these testing scores form weighted values that are then assigned to respective edges in the directed acyclic graph created for the software product in response to an upgrade request. The upgrade path calculation unit can then iterate through the various upgrade paths present in the graph to calculate, for each upgrade path, an overall weight value or index indicating a degree of risk or stability associated with an upgrade path, and an overall weight value or index indicating an estimated amount of time required to perform the upgrade. Table A below shows an example of a table data structure that may be used to store upgrade testing results.

TABLE A

| Starting Version | Ending Version | Stability (or Risk) Score | Upgrade Time Score |
| --- | --- | --- | --- |
| 1.0 | 1.1 | wa1 | wb1 |
| 1.1 | 1.2 | wa2 | wb2 |
| 1.2 | 2.0 | wa3 | wb3 |
| 1.0 | 2.0 | wa4 | wb4 |
| 2.0 | 2.1 | wa5 | wb5 |
| 2.1 | 2.2 | wa6 | wb6 |
| 2.2 | 3.0 | wa7 | wb7 |
| 2.0 | 3.0 | wa8 | wb8 |
| 3.0 | 3.1 | wa9 | wb9 |
| ... | ... | ... | ... |

As shown in the example of a table A above, a column labeled "Starting Version" identifies the starting version to be upgraded from; a column labeled "Ending Version" identifies the version to be upgraded to; a column labeled "Stability (or Risk) Score" lists a score (e.g., weighted value) indicating a degree of stability or risk associated with upgrading from the corresponding starting version to the corresponding ending version; and a column labeled "Upgrade Time Score" lists a score indicating an amount of time associated with upgrading from the corresponding starting version to the corresponding ending version. As discussed above, these scores or weighted values may be the result of testing performed by a QA team. The upgrade path calculation unit can access these weighted values in order to assign them to the corresponding edges in the graph.

FIG. 4 shows an overall flow for generating an upgrade plan. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a directed acyclic graph is built. The graph includes a set of nodes and a set of edges. Each node represents a version of the software product. Each edge represents an upgrade path between a pair of nodes. Thus, a first node of the pair of the nodes represents a first version of the software product (e.g., earlier or older version), a second node of the pair of nodes represents a second version, after the first version (e.g., later or newer version); and an edge from the first node to the second node represents an upgrade of the software product from the first version to the second version.

In a specific embodiment, the graph is built in response to receiving from a customer user an indication or other input that they wish to upgrade a software product on their computing machine. An initial node of the graph may be set to correspond to a version of the software product currently installed on the computing device. A final or last node in the graph may be set to correspond to a desired version of the software product the customer user wishes to upgrade to. In a specific embodiment, the customer user is prompted to input or identify the desired version of the software product the customer user would like to upgrade to. In a specific embodiment, the customer user is likewise prompted to input or identify the version of the software product currently installed on their computing device. In another specific embodiment, the current version of the software product that is installed on their computing device may be automatically detected.

In a step 415, a set of weighted values of a first type and a set of weighted values of a second type are assigned to the set of edges. The first type of weighted value indicates a degree or level of stability associated with upgrading an earlier version of the software product to a later version of the software product. The second type of weighted value indicates an estimated amount of time or duration required to upgrade from the earlier version to the later version of the software product.

In a step 420, using the first type of weighted values, a first upgrade path is generated. The first upgrade path extends through the graph to a node representing a desired version of the software product that the customer user wishes to upgrade to. The first upgrade path may begin or start at a node in the graph that represents a version of the software product that is currently installed on the customer's computing device.

There may be a first set of one or more intermediate nodes along the first upgrade path between the starting node representing the currently installed version and final ending node representing the desired version. The first set of intermediate nodes represent the intermediate versions of the software product that should be installed on the customer's computing device before installation of the desired version of the software product that the customer user wishes to upgrade to. The order in which the first set of intermediate nodes appear along the first upgrade path indicates the sequence in which the first set of intermediate versions of the software product should be installed on the customer's computing device.

The first upgrade path corresponds to a first upgrade plan that minimizes risks associated with upgrading to the desired version of the software product. As discussed, these risks may include the possibility of data loss, loss of existing function, compatibility problems, configuration conflicts, and so forth. The first upgrade plan may be referred to as a most stable plan.

In a step 425, using the second type of weighted values, a second upgrade path is generated. The second upgrade path extends through the graph to the node representing the desired version of the software product that the customer user wishes to upgrade to. The second upgrade path may begin or start at the node in the graph that represents the version of the software product that is currently installed on the customer's computing device.

There may be a second set of one or more intermediate nodes along the second upgrade path between the starting node representing the currently installed version and final ending node representing the desired version. The second set of intermediate nodes represent the intermediate versions of the software product that should be installed on the customer's computing device before installation of the desired version of the software product that the customer wishes to upgrade to. The order in which the second set of intermediate nodes appear along the second upgrade path indicates the sequence in which the second set of intermediate versions of the software product should be installed on the customer's computing device.

The second upgrade path corresponds to a second upgrade plan that minimizes an estimated time to complete the upgrade to the desired version. The second upgrade plan may be referred to as a quickest plan.

The number of intermediate nodes in the first set of intermediate nodes (associated with the first upgrade path) may be different from the number of intermediate nodes in the second set of intermediate nodes (associated with the second upgrade path). For example, the number of intermediate nodes in the first set of intermediate nodes may be greater than the number of intermediate nodes in the second set of intermediate nodes as it can often be the case that the most stable upgrade plan includes the most number of minor incremental releases. This is not necessarily always the case, however, and the number of intermediate nodes in the first set of intermediate nodes may be less than the number of intermediate nodes in the second set of intermediate nodes. The number of intermediate nodes in the first set of intermediate nodes may be the same as the number of intermediate nodes in the second set of intermediate nodes.

The intermediate nodes in the first set of intermediate nodes may be the same as or different from the intermediate nodes in the second set of intermediate nodes. In some cases, at least some of the intermediate nodes in the first and second sets of intermediate nodes may overlap. For example, the first and second upgrade paths may identify one or more of the same particular intermediate software versions be installed. The first and second upgrade paths may diverge from each other and may identify one or more different particular intermediate software versions be installed.

In a step 430, the first and second upgrade paths or upgrade plans are presented to the customer user. The customer user is prompted to select one of the first or second upgrade paths or plans.

In a step 435, the customer user's response is received. The system creates or assembles, in response to the selection, one of a first or second upgrade package corresponding to whether the user selected the first or second upgrade plan. For example, if the user selected the first upgrade plan, the first upgrade package is created. If the user selected the second upgrade plan, the second upgrade package is created.

Thus, the first and second upgrade packages may be different from each other. The upgrade package (first or second) includes the desired version of the software product the customer wishes to upgrade to, at least a subset of intermediate or earlier versions of the software product, and a sequence indicating an order in which the intermediate versions should be installed on the customer's computing device. The upgrade package may include executable instructions or commands to direct the installation process on the customer's computing device. The upgrade package may include a set of executable files, overwrite commands, software patches, release notes, an installer program, or combinations of these.

In a specific embodiment, the upgrade package is created dynamically based on the customer user's response. In other words, the upgrade package does not exist as a pre-built or pre-assembled file. In this specific embodiment, the upgrade package is not created until after the customer user has selected the particular upgrade plan they would like to proceed with. In this specific embodiment, upon the customer user selecting the particular upgrade plan, the upgrade package builder consults the corresponding upgrade path to identify the relevant intermediate software product versions (along with the desired ending version) stored in the software product repository. These specific versions may then be copied from the repository and into an upgrade package (e.g., file or container) for the user to download. Creating the upgrade package dynamically can help to reduce storage requirements by reducing the number of redundant copies of the various versions of the software product that are stored.

In another specific embodiment, one or more upgrade packages may be pre-assembled (e.g., assembled before the user a selects a particular upgrade plan). For example, in other embodiments, first and second upgrade packages may be pre-assembled. The first upgrade package may correspond to an upgrade plan that minimizes risks associated with upgrading. The second upgrade package may correspond to an upgrade plan that minimizes an estimated time associated with the upgrading. Pre-assembling upgrade packages can help to improve response time as the customer user will not have to wait for an upgrade package to be assembled after selecting a particular upgrade plan.

Generally, the upgrade plan that is the most stable will require a greater amount of time to complete as compared to the upgrade plan that minimizes the estimated upgrade time. The system provides the flexibility for the user to choose the upgrade plan that best meets their particular needs.

In a step 440, the upgrade package is transmitted over the network or downloaded to the customer user for installation on the customer's computing device. The upgrade package may be compressed prior to transmission in order to reduce a size of the upgrade package and conserve network bandwidth. In an embodiment, after the upgrade package has been downloaded to the customer's computing device, the user may run an installer program included in the upgrade package to install the desired version of the software product, including any intermediate versions, on the computing device.

For example, the installer program may be run by double-clicking an icon associated with the installer program. Files, instructions, and other data included in the upgrade package may be read into memory to be executed. The installer program may decompress files that have been compressed into the upgrade package and write new files associated with the upgrade to the hard drive or other persistent storage of the customer's computing device. As a result of the upgrade process, source code, binaries, or other data associated with the version of the software product previously installed on the computing device may be overwritten with data associated with the desired version of the software product to upgrade to. Once the upgrade of the customer's computing device is complete, the customer user will be able to enjoy the benefits provided by having the newer desired version of the software product (e.g., increased performance, new features, bug fixes, and so forth) installed on their computing device.

Figure 5:
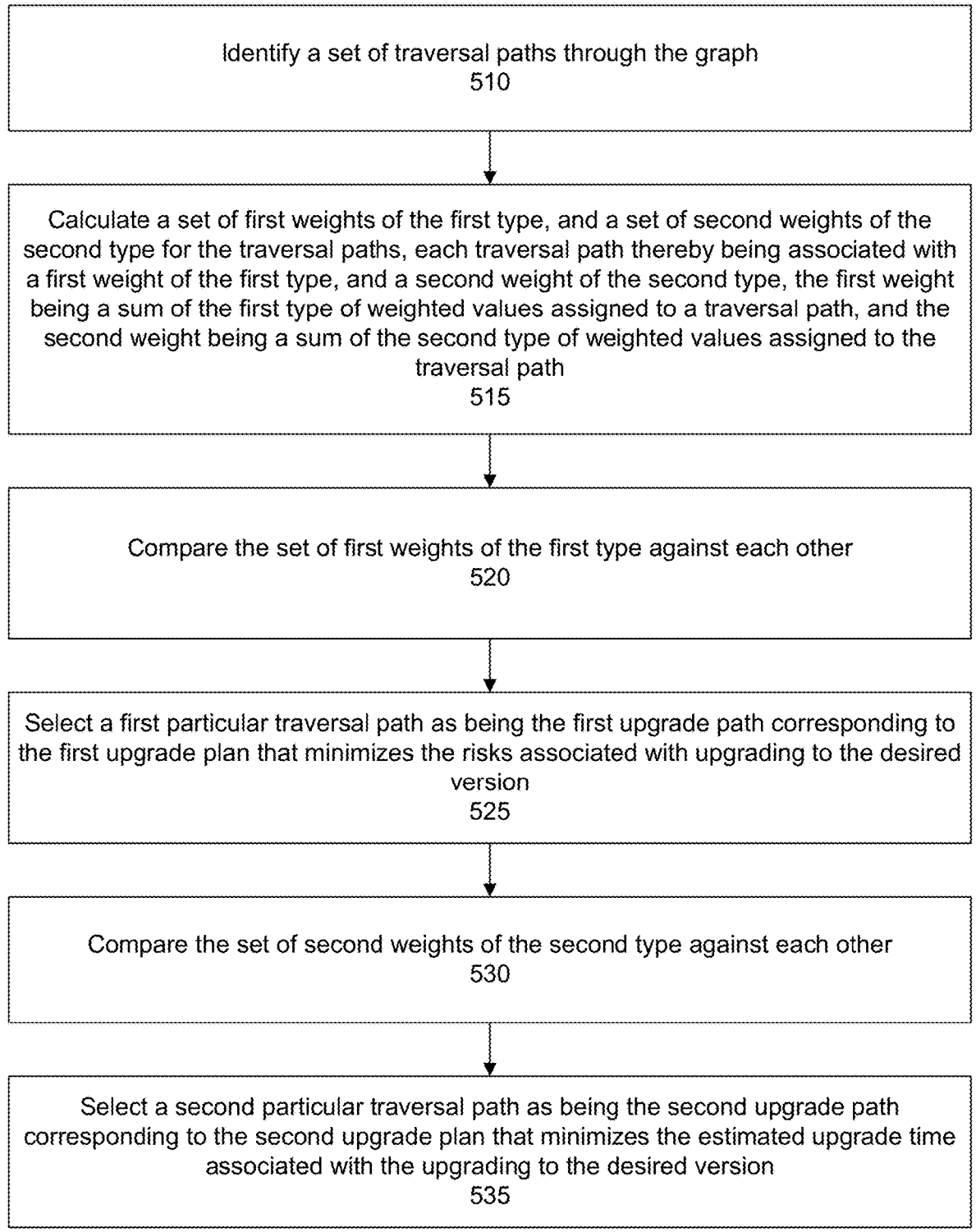
FIG. 5 shows a flow for selecting a particular upgrade path present in a directed acyclic graph, according to one or more embodiments.

FIG. 5 shows further detail of a flow for calculating the first and second upgrade paths through the directed acyclic graph. In a step 510, a set of traversal paths through the graph is identified. Each traversal path corresponds to a possible way that a software product may be upgraded to a desired version. Thus, a traversal path may identify an initial or starting node, one or more intermediate nodes, an ending or final node, and edges between pairs of nodes. As discussed, the starting node represents a currently installed version of the software product, the ending node represents a desired version of the software product to be installed, the intermediate nodes represent intermediate or earlier versions of the software product to be installed before the desired version is installed, and an edge represents an upgrade from an earlier version to a later version of the software product.

In a specific embodiment, the edges are assigned two types of weighted values. A first type of weighted value indicates a degree of risk (or, conversely, stability) associated with upgrading from the earlier to later version. A second type of weighted value indicates an estimated amount of time associated with the upgrade from the earlier to later version.

In a step 515, a set of weights of the first type, and a set of weights of the second type are calculated for the traversal paths. In this specific embodiment, each traversal path is thereby associated with a first weight of a first type and a second weight of the second type. In a specific embodiment, a first weight of a traversal path is calculated by summing the first type of weighted values assigned to edges of the traversal path. A second weight of the traversal path is calculated by summing the second type of weighted values assigned to the edges of the traversal path.

In a step 520, the set of first weights of the first type of weighted values are compared against each other.

In a step 525, a first particular traversal path is selected as being the first upgrade path corresponding to the first upgrade plan that minimizes risks associated with upgrading to the desired version. In a specific embodiment, the first particular traversal path is identified as that particular path having the lowest first weight.

In a step 530, a set of weights of the second type of weighted values are compared against each other.

In a step 535, a second particular traversal path is selected as being the second upgrade path corresponding to the second upgrade plan that minimizes the estimated upgrade time associated with upgrading to the desired version. In a specific embodiment, the second particular traversal path is identified as that particular path having the lowest second weight.

Figure 6:
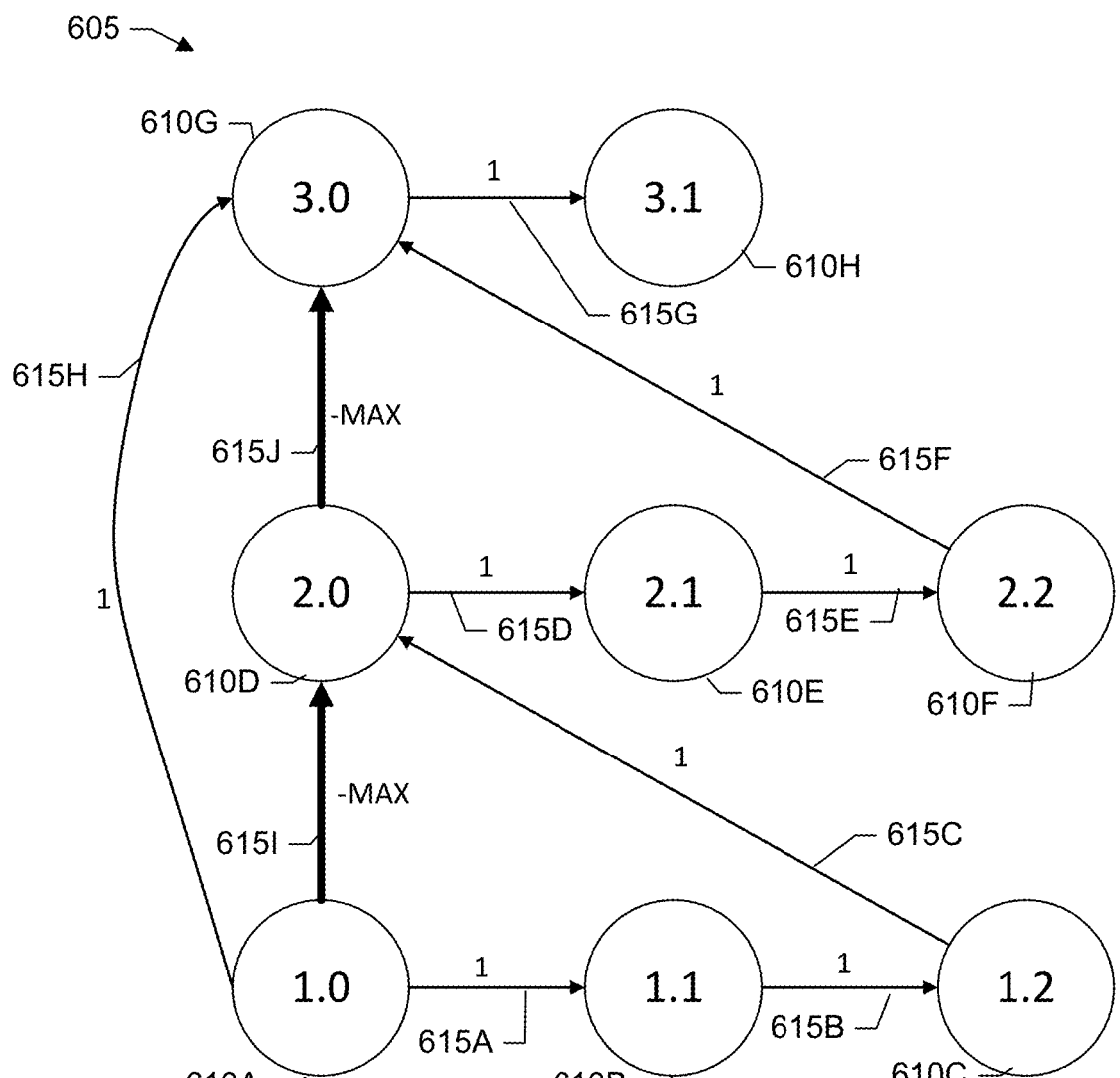
FIG. 6 shows an example of a stable edge, according to one or more embodiments.

FIGS. 6-12 show examples of using a directed acyclic graph to model various versions of a software product and generate upgrade paths. Specifically, FIG. 6 shows an example of a directed acyclic graph 605.

Specifically, this graph includes nodes 610A-H and edges 615A-J. Nodes 610A-H represent versions 1.0, 1.1, 1.2, 2.0, 2.1, 2.2, 3.0, and 3.1, respectively, of the software product. Edges 615A-J represent an upgrade from an earlier version of the software product to a later version of the software product. As shown in the example of FIG. 6, there are many different paths that can be used to upgrade from version 1.0 (node 610A) to version 3.1 (node 610H).

For example, one upgrade path may include upgrading from version 1.0 (node 610A) to version 1.1 (node 610B) to version 1.2 (node 610C) to version 2.0 (node 615D) to version 2.1 (node 610E) to version 2.2 (node 610F) to version 3.0 (node 610G) to version 3.1 (node 610H). Another upgrade path may include upgrading from version 1.0 (node 610A) to version 1.1 (node 610B) to version 1.2 (node 610C) to version 2.0 (node 615D) to version 3.0 (node 610G) to version 3.1 (node 610H) Another upgrade path may include upgrading from version 1.0 (node 610A) to version 3.0 (node 610G) to version 3.1 (node 610H). And so forth.

Figure 7:
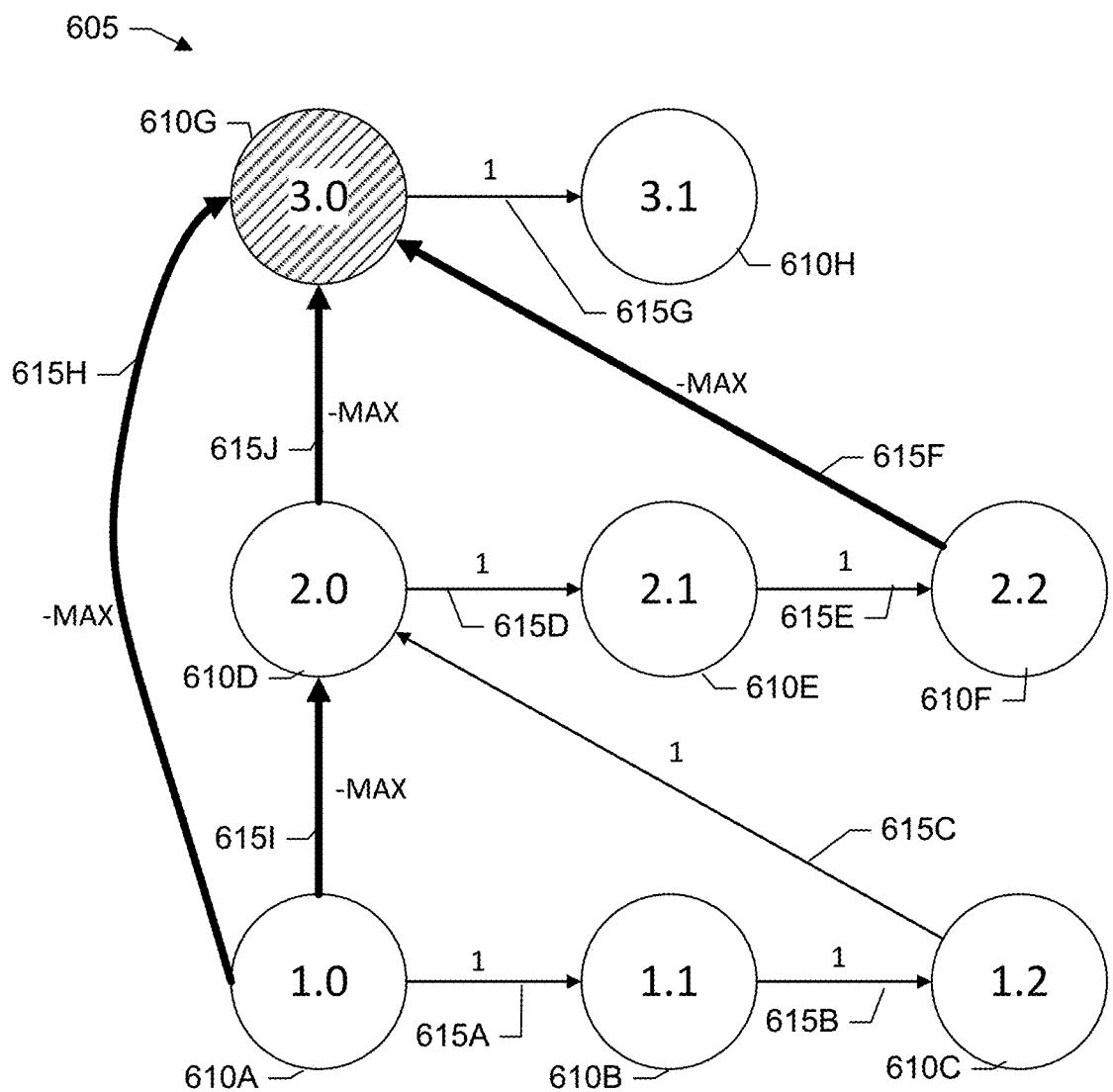
FIG. 7 shows an example of a stable node, according to one or more embodiments.

Each edge is assigned a weighted value of a first type. In the example shown in FIG. 6 edges 615A-H have been assigned a value of 1. Edges 615I,J have been assigned a value of −MAX. In a specific embodiment, to generate a most stable plan, the weight of an edge is chosen based on:
1) Normal edge, using 1
2) Stable edge (well-tested), using −MAX The value of MAX could be a large positive number. In a specific embodiment, the value is defined as 999, so, −MAX=−999. If there is no stable edge in the graph, the plan will degenerate to the quickest plan (automatically via calculation). A stable version/node refers to a recommended version, usually a generally available (GA) version. A GA version may also be referred to as a production release. The GA designation indicates that the version is stable, having successfully passed through all earlier release stages. GA indicates that the version is believed to be reliable, free of serious bugs, and suitable for use in production systems. All "in edges" of the stable node are stable edges. Thus, stable nodes correspond to recommended nodes and stable path corresponds to the recommend upgrade path. The stable plan may not be the shortest path, but rather the lowest risk plan for the upgrade. In the example of FIG. 6, edges 615I,J are shown using bolded arrows to indicate an example of the stable edge. In the example of FIG. 7, node 610G is shown with a fill pattern to indicate an example of the stable node.

Figure 8:
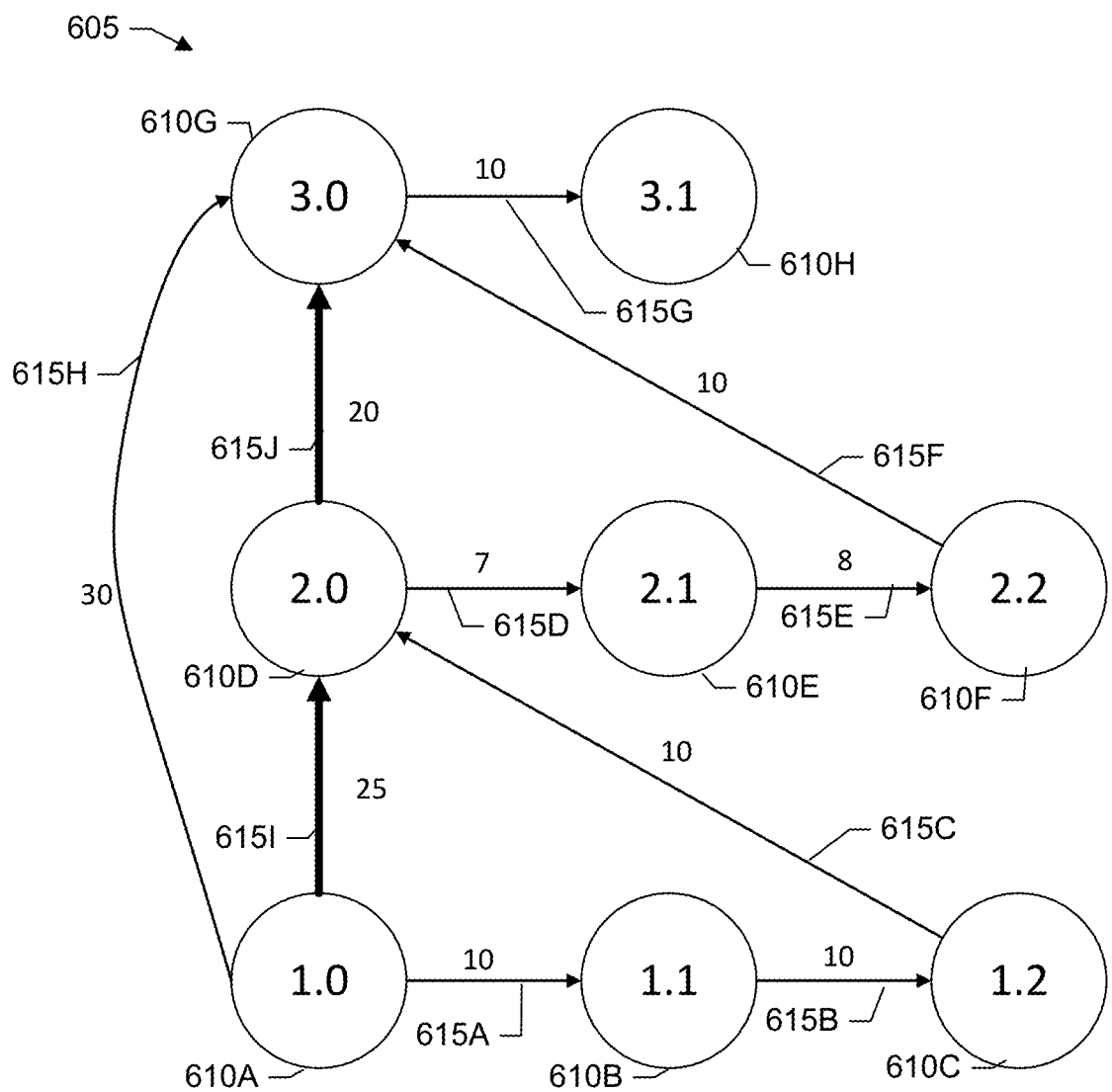
FIG. 8 shows an example of a time cost edge, according to one or more embodiments.

FIG. 8 shows an example of assigning weighted values of a second type to the edges to show the time cost edge. FIG. 8 shows an example of generating the quickest plan. In a specific embodiment, to generate the quickest plan, the weight of "edge" is determined as the average upgrade time (time cost), in minutes.

Alternatively, the weight may be defined using a function such as shown in FIG. 9. According to this example of the function, upgrade durations ranging between 0 and less than 10 minutes are assigned a value of 1. Upgrade durations ranging between 10 and 30 minutes are assigned a value of 2. And so forth. It should be appreciated that the function shown in FIG. 9 is merely for purposes of illustration. Other embodiments may specify different ranges, assigned values, and so forth.

The upgrade time may include, as applicable, data migration time and system reboot time. The upgrade time may be estimated from testing.

Referring back now to FIG. 8, in this example, edges 615A, 615B, 615C, 615F, and 615G have been assigned a value of 10. Edge 615I has been assigned a value of 25. Edge 615D has been assigned a value of 7. Edge 615E has been assigned a value of 8. Edge 615J has been assigned a value of 20. Edge 615H has been assigned a value of 30.

For the graph, given a first node (e.g., node A) to a second node (e.g., node B), all paths are traversed. For each path, a calculation is made of a sum of the weighted values assigned to the edges. FIG. 10 shows a formula for calculating the weight of a path and plan. The upgrade plan is thus the path having min(Wpath). In other words, the upgrade plan is equivalent to the lowest cost path. In a specific embodiment, the formula shown in FIG. 10 is used to calculate the weight of each path and the lightest path is identified and selected as the recommended plan.

Figure 11:
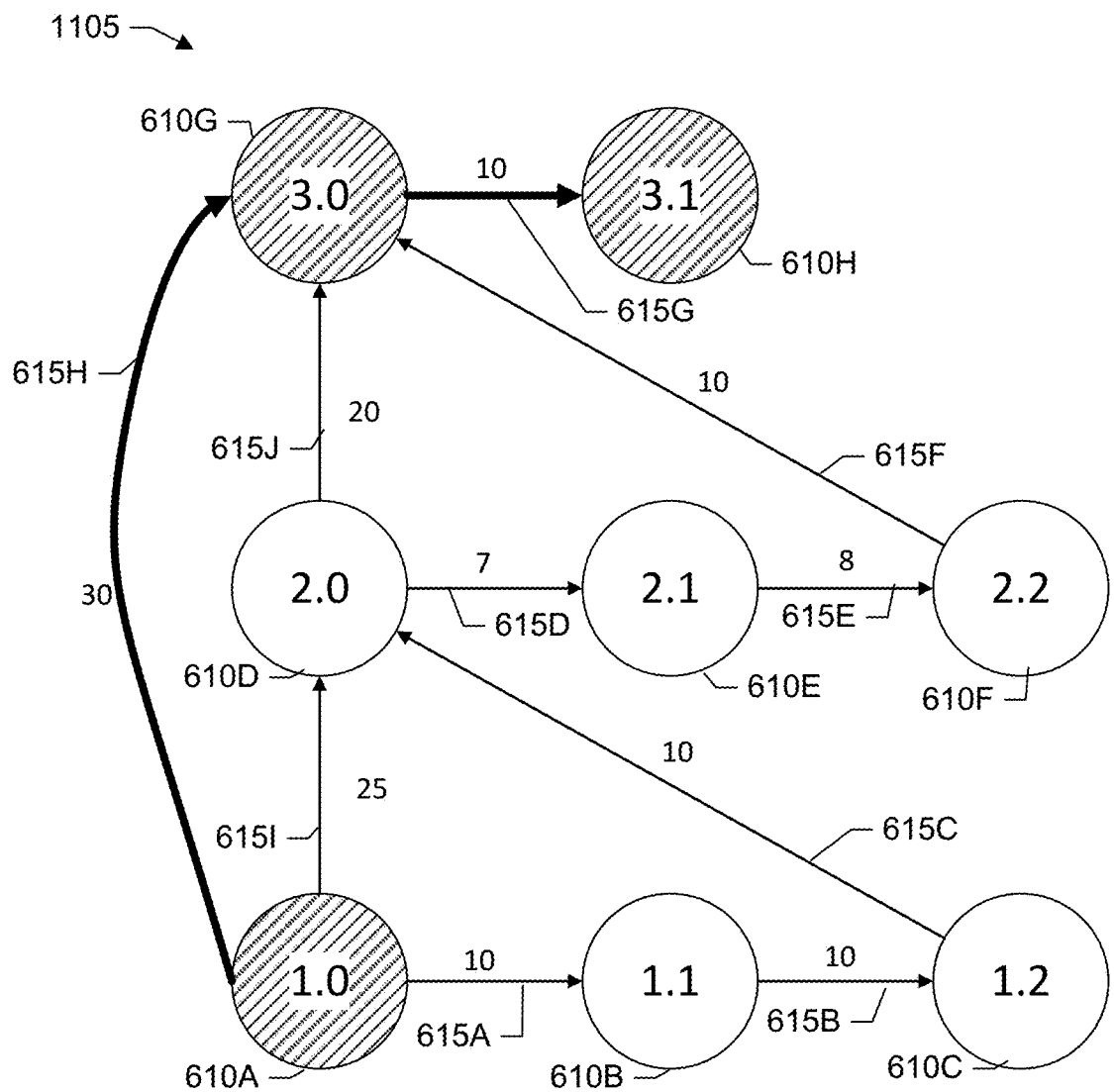
FIG. 11 shows another example of the time cost edge, according to one or more embodiments.
Figure 12:
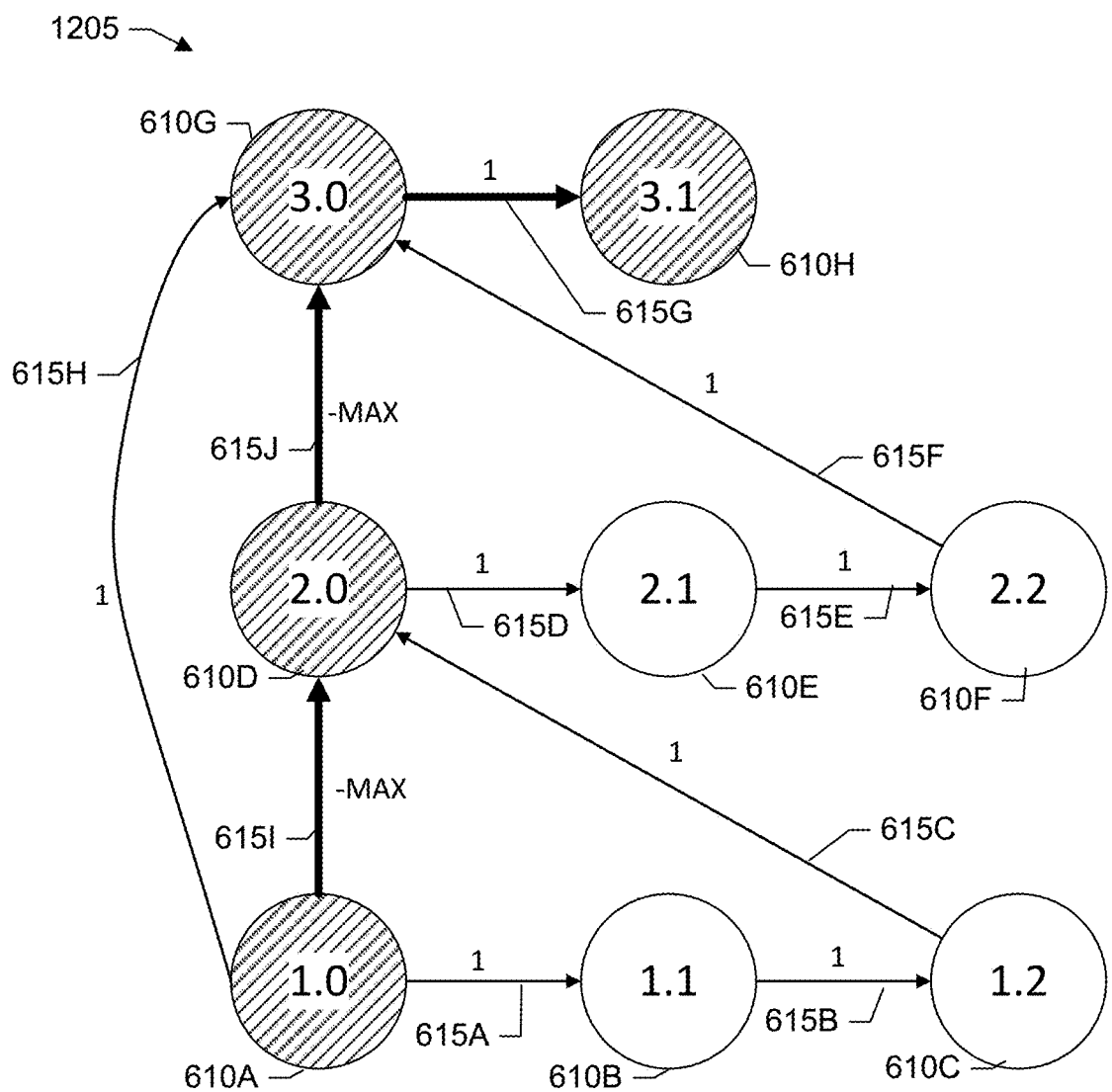
FIG. 12 shows an example of a most stable plan, according to one or more embodiments.

FIGS. 11 and 12 show examples of two upgrade plans that may be generated using the techniques discussed above. In particular, FIG. 11 shows a quickest plan 1105. The quickest plan includes an upgrade path from version 1.0 (node 610A) to version 3.0 (node 610G) to version 3.1 (node 610H). In the graph shown in FIG. 11, nodes 610A, 610G, and 610H included in the quickest plan are shown with a fill pattern. And, edges 615H and 615G included in the quickest plan are shown using bolded arrows.

FIG. 12 shows a most stable plan 1205. The most stable plan includes an upgrade path from version 1.0 (node 610A) to version 2.0 (node 610D) to version 3.0 (node 610G) to version 3.1 (node 610H). In the graph shown in FIG. 12, noes 610A, 610D, 610G, and 610H included in the most stable plan are shown with a fill pattern. And, edges 615I, 615J, and 615G included in the most stable plan are shown using bolded arrows.

Figure 13:
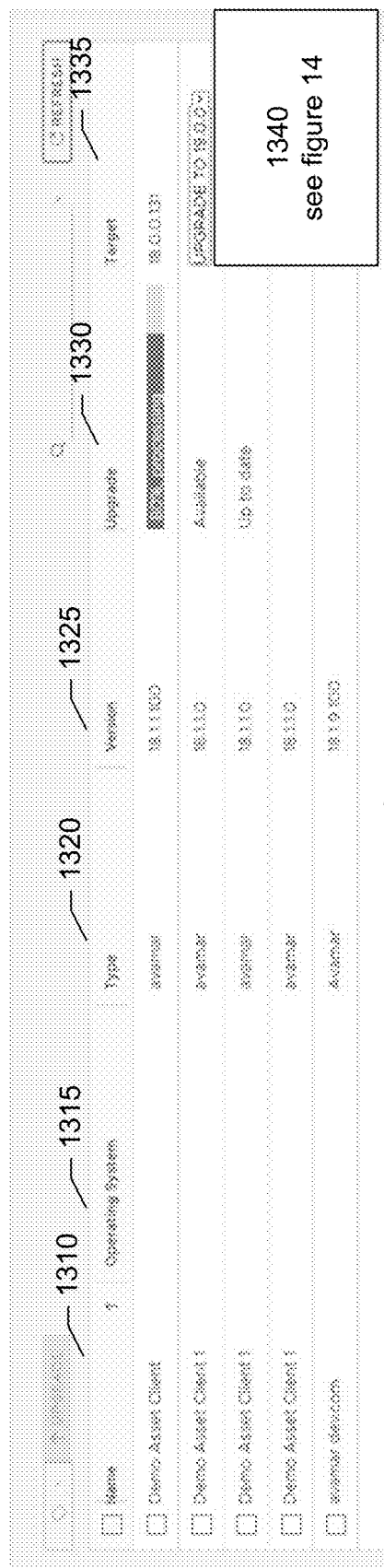
FIG. 13 shows a graphical user interface (GUI) for upgrading a server, according to one or more embodiments.

FIG. 13 shows a screenshot of a user interface of the upgrade manager that may be presented to the end user. The user interface includes an assets table 1305 listing names 1310 of various assets (e.g., computing devices) and details of each asset. These details may include operating system 1315, type 1320, software product version 1325, upgrade status 1330, and upgrade target version 1335. The upgrade target version includes a dropdown control having a menu 1340. The menu options are shown in FIG. 14.

Figure 14:
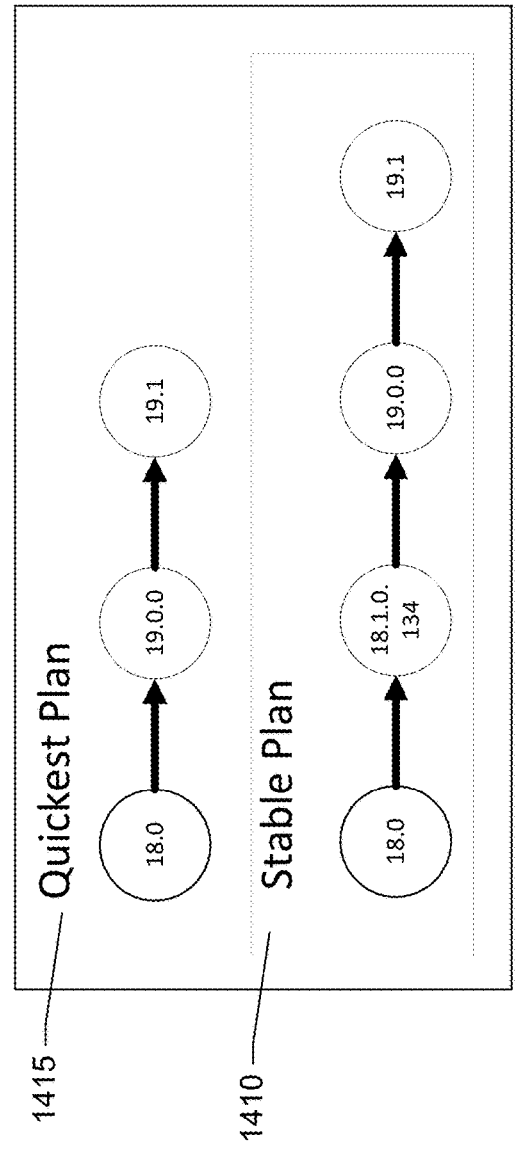
FIG. 14 shows user-selectable options in a dropdown menu for selecting an upgrade strategy, according to one or more embodiments.

As shown in the example of FIG. 14, there are first and second options. A first option 1410 includes the most stable upgrade plan. A second option 1415 includes the quickest plan. The two upgrade plans (quickest plan and most stable plan) can be provided to the end user to simplify the upgrade process. The end user, rather than only being able to upgrade to a direct higher-version, is provided with a safe and quick way to upgrade to any higher version in a single step (by executing the plan automatically).

As discussed above, upon the end user selecting the quickest plan or most stable plan, an upgrade package is assembled responsive to the selection. In the example shown in FIG. 14, if the user selects the most stable plan, a first upgrade package is assembled. The first upgrade package includes software product versions 18.1.0.134, 19.0.0, and 19.1 and instructions directing the order of the upgrade to be from version 18.0 to version 18.1.0.134 to version 19.0.0 and finally to version 19.1.

Alternatively, if the user selects the quickest plan, a second upgrade package, different from the first upgrade package is assembled. The second upgrade package includes software product versions 19.0.0 and 19.1 and instructions directing the order of the upgrade to be from version 18.0 to version 19.0.0 and finally to version 19.1.

The first upgrade package (stable plan) may also include additional or other instructions not present in, omitted, or excluded from the second upgrade package (quick plan) to help ensure the stability of the upgrade. For example, the first upgrade package may include an installer program that requires that additional precautions be satisfied before an upgrade can begin. The additional precautions may include, for example, requiring that all applications on the computing device be closed, requiring all data to be backed up, creating a system restore point, other precaution, time restrictions (e.g., requiring that the upgrade proceed during non-peak hours), power restrictions (e.g., requiring in the case of a portable mobile device that the device be plugged into a separate power supply rather than being run from the battery of the device), or combinations of these.

These precautions, while requiring some additional time, can help to minimize potential problems with the upgrade. For example, requiring that all applications be closed helps to ensure that the installer program will have access to registry keys, files, or both that may otherwise be locked by a running application on the computing device. The system restore point allows the computing device to be restored to its previous state should the upgrade have to be aborted. Backing up data helps to prevent the loss of data. Such precautions may or may not be included in an installer program for the second upgrade package (quick plan).

A first installer program for the first upgrade package (stable plan) may include detecting whether an application program is open on a computing device to be upgraded, and if detected, requiring the application program to be closed before continuing with the upgrade. A second installer program for the second upgrade package (quick plan) may not include the detecting and requirement steps. As another example, the first installer program may include creating a system restore point prior to continuing with the upgrade. The second installer program may not include creating a system restore point. As another example, the first installer program may include backing up the computing device prior to continuing with the upgrade. The second installer program may not include the backing up requirement. As another example, the first installer program may specify a time restriction indicating when an upgrade is allowed or not allowed to occur. The second installer program may not specify the time restriction. As another example, the first installer program may require the computing device (mobile computing device) be plugged into a wall outlet. The second installer program may not require the computing device to be plugged into the wall outlet.

Referring back now to FIG. 1, a computing environment of the customer may include any number of compute devices—at least some of which may have different installed versions of a software product. In many cases, users in an organization may be running any number of different versions of a particular software product. Upgrading is a manual process and some users are more rigorous as compared to other users in regards to upgrading their client devices as recommended by their information technology (IT) departments.

For example, software product 109 is installed on clients A-C. Clients 104B and 104C each have version D of software product 109. Client 104A, however, has version C of software product 109. It can be very frustrating and time-consuming to manage the IT needs of an organization when different clients have different versions of software installed. For example, some versions may be incompatible with other software programs or applications that the organization uses; have expired licenses; found to have security flaws that may put not only the individual client machine at risk for a security breach, but the entire organization; and so forth. In an embodiment, systems and techniques are provided to facilitate upgrading a set of compute devices, e.g. clients, having different versions of a software product to a same common version of the software product. Upgrading everyone in an organization to the same version can help streamline IT operations, ensure that security patches on each individual client are up-to-date, and provide other benefits.

Figure 15:
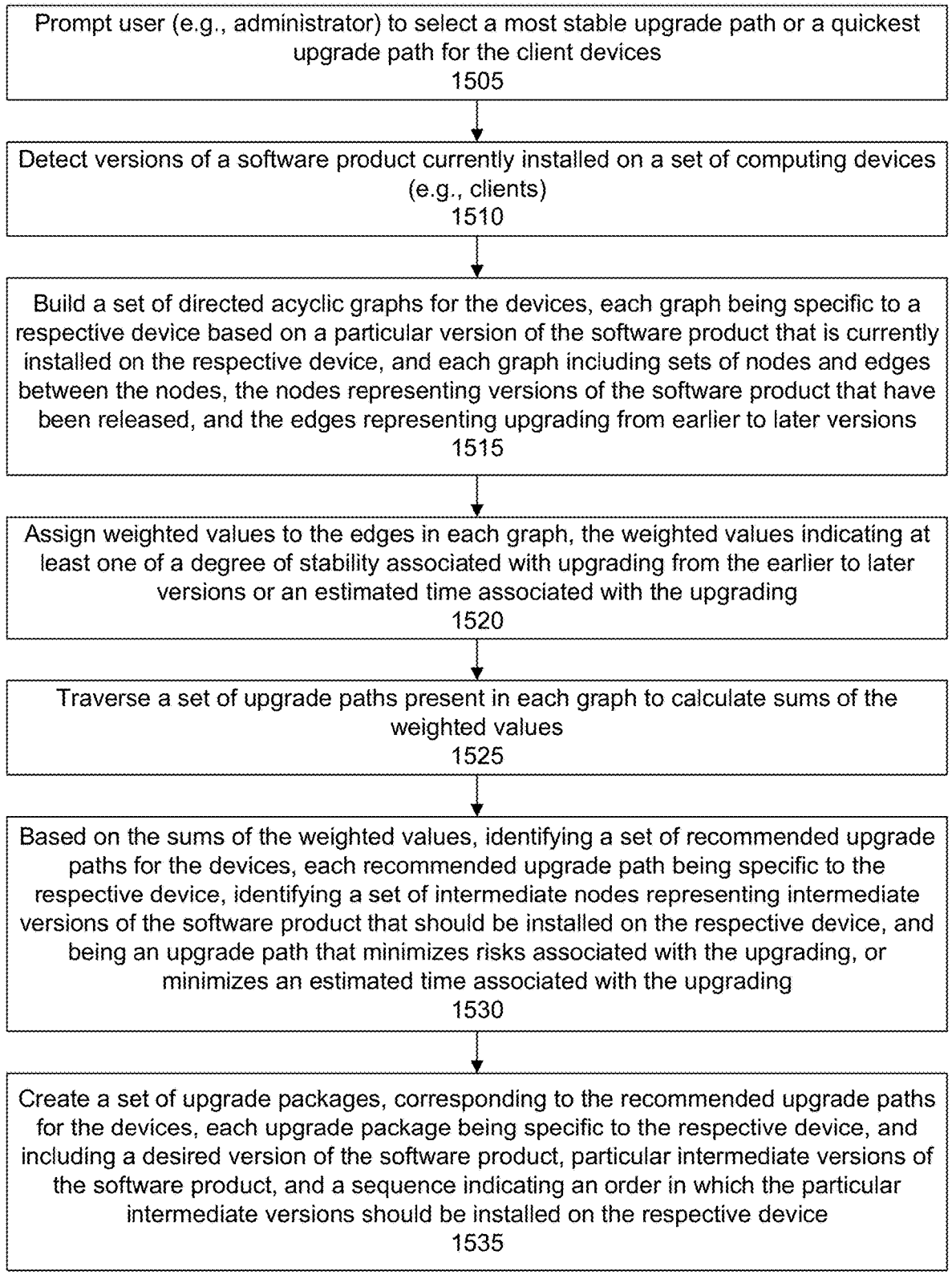
FIG. 15 shows a flow for upgrading a set of clients, according to one or more embodiments.

FIG. 15 shows an overall flow for upgrading a set of clients to have the same common version of a software product. In a step 1505, a customer user, such as an administrator, is prompted to select a most stable upgrade path for all the clients or a quickest upgrade path for all clients in the set of clients. The user selection is then received. In other words, rather than the user having to select a particular type of upgrade path for each individual client, the user can specify that a particular type of upgrade path is to apply to multiple (e.g., two or more) clients to be upgraded. The clients can be upgraded in batch to a particular desired version and according to the same type of upgrade plan (e.g., stable or quick). More specifically, the user can specify that a most stable upgrade path is to be applied for upgrading all clients in a set of clients. Alternatively, the user can specify that a quickest upgrade path is to be applied for upgrading all clients in the set of clients.

In a step 1510, versions of a software product currently installed on a set of computing devices (e.g., clients) are detected. The detecting may be performed using a plug-in installed on the client device, through a set of APIs, analyzing packets (e.g., header data) received from the client device, prompting the user to specify the currently installed version, or any other competent technique.

In a step 1515, a set of directed acyclic graphs are built for the client devices. Each graph is specific to a respective client device. Thus, the number of graphs may be equal to the number of client devices that are to be upgraded. There can be multiple (e.g., two or more) graphs in cases where there are multiple client devices. A graph for the respective device is based on a particular version of the software product that is currently installed on the respective device. As discussed above, each graph includes a set of nodes and a set of edges between the nodes. The nodes represent versions of the software product that have been released. The edges represent upgrading from earlier to later versions.

Figure 16:
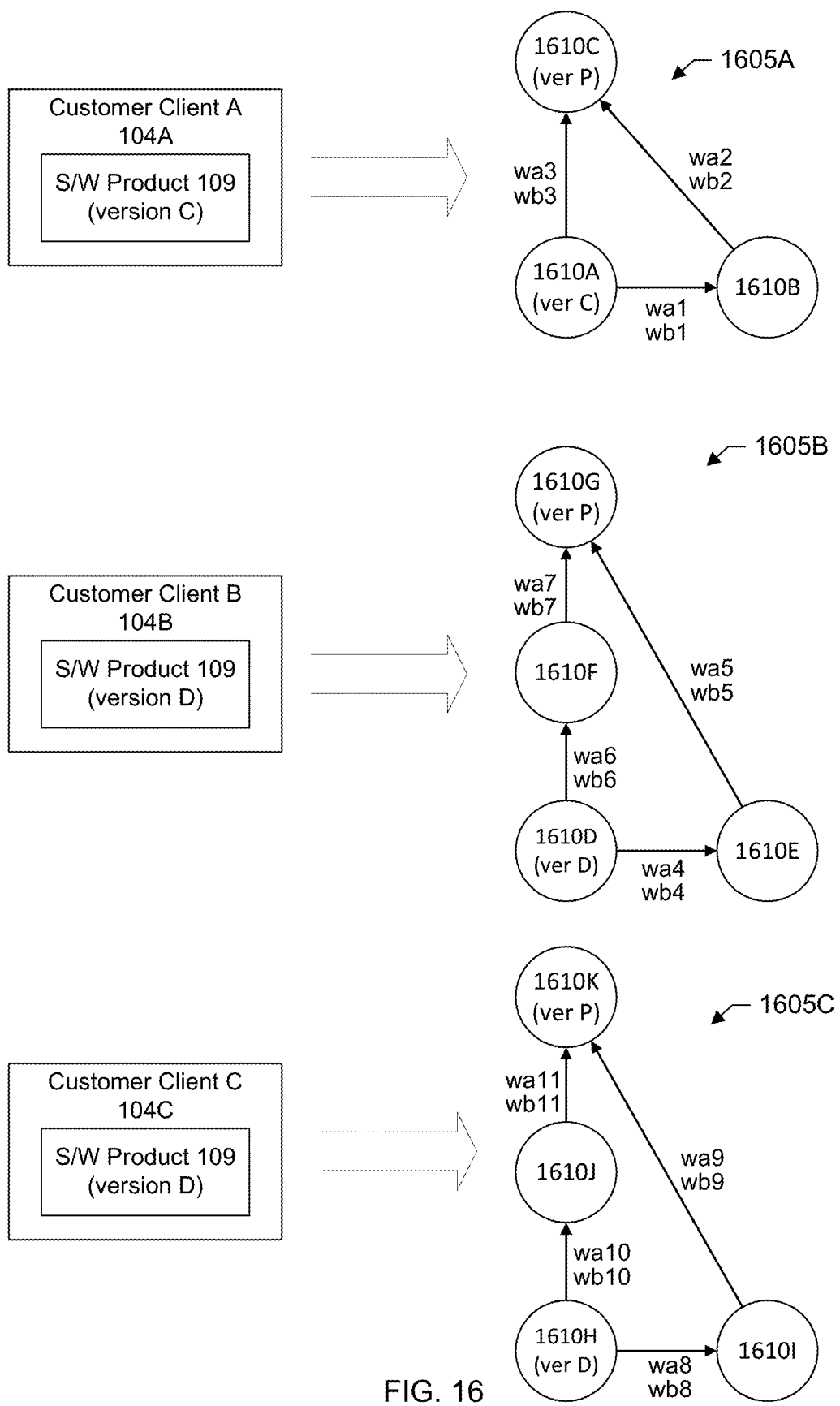
FIG. 16 shows a block diagram of directed acyclic graphs generated for various clients, according to one or more embodiments.

For example, FIG. 16 shows a block diagram of clients 104A-C and a set of directed acyclic graphs 1605A-C built or created for the clients. Graph 1605A is specific to client 104A. An initial node 1610A of graph 1605A represents a version of the software product (version C) currently installed on client 104A. A final node 1610C of graph 1605A represents a desired version of the software product (version P) that client 104A should be upgraded to.

Similarly, graph 1605B is specific to client 104B. An initial node 1610D of graph 1605B represents a version of the software product (version D) currently installed on client 104B. A final node 1610G of graph 1605B represents a desired version of the software product (version P) that client 104B should be upgraded to.

Similarly, graph 1605C is specific to client 104C. An initial node 1610H of graph 1605C represents a version of the software product (version D) currently installed on client 104C. A final node 1610K of graph 1605C represents a desired version of the software product (version P) that client 104C should be upgraded to.

As shown in the example of FIG. 16, the final node in each graph (e.g., node 1610C—graph 1605A, node 1610G—graph 1605B, and node 1610K—graph 1605C) represent the same version of the software product to indicate that all clients are to be upgraded to a common or same desired version of the software product. However, graph 1605A is different from graph 1605B because respective clients 104A, 104B have different versions of the software product currently installed. In particular, client 104A has version C of the software product and client 104B has version D of the software product. Thus, the upgrade paths (or at least a subset of the upgrade paths) through graph 1605A to the desired version may be different from the upgrade paths (or at least a subset of the upgrade paths) through graph 1605B to the desired version.

Referring back now to FIG. 15, in a step 1520, weighted values are assigned to the edges in each graph. In other words, weighted values are assigned to edges of graph 1605A (FIG. 16), weighted values are assigned to edges of graph 1605B, and so forth.

The weighted values process is similar to that in step 415 (FIG. 4) and described in the accompanying discussion. As discussed above, the weighted values provide a measurement of an attribute associated with the upgrading (e.g., upgrading from an early version of the software product as represented by a node of a pair of nodes in the graph to a later version of the software product as represented by another node in the pair of nodes in the graph). These attribute measurements may be collected during QA testing of the software product.

In various specific embodiments, the attribute may be an assessment of a degree of risk or, conversely, a degree of stability associated with the upgrading. The attribute may be an assessment of an estimated duration of time associated with the upgrading. That is, in a specific embodiment, the weighted values indicate at least one of a degree of risk (or stability) associated with the upgrading or an estimated duration of time associated with the upgrading. Thus, there can be weighted values of a first type (e.g., risk/stability assessment) assigned to the edges, weighted values of a second type (e.g., upgrade time) assigned to the edges, or both.

The type of weighted values assigned to the edges are based on the user's selection of the most stable upgrade path or the quickest upgrade path (step 1505) for the clients. For example, if the user selected the most stable upgrade path, weighted values of the first type may be assigned to the edges (e.g., weighted values wa1-wa11). If the user selected the quickest upgrade path, weighted values of the second type may be assigned to the edges (e.g., weighted values wb1-wb11).

Referring back now to FIG. 15, in a step 1525, upgrade paths present in each graph are traversed to calculate sums of the weighted values. For example, as shown in FIG. 16, graph 1605A includes first and second upgrade paths. In graph 1605A, the first upgrade path is from node 1610A (current version on client 104A) to node 1610B (intermediate version) to node 1610C (desired version for client 104A). The second upgrade path is from node 1610A (current version on client 104A) to node 1610C (desired version for client 104A).

Thus, a first sum of the first type of weighted values for the first upgrade path is wa1+wa2. A second sum of the first type of weighted values for the second upgrade path is wa3.

Alternatively, if the user selected the quickest upgrade path for the clients, a first sum of the second type of weighted values for the first upgrade path is wb1+wb2. A second sum of the second type of weighted values for the second upgrade path is wb3.

Graph 1605B includes third and fourth upgrade paths. In graph 1605B, the third upgrade path is from node 1610D (current version on client 104B) to node 1610E (intermediate version) to node 1610G (desired version for client 104B). The fourth upgrade path is from node 1610D (current version on client 104B) to node 1610F (intermediate version) to node 1610G (desired version for client 104B).

Thus, a first sum of the first type of weighted values for the third upgrade path is wa4+wa5. A second sum of the first type of weighted values for the fourth upgrade path is wa6+wa7.

Alternatively, if the user selected the quickest upgrade path for the clients, the second type of weighted values are summed. Specifically, a first sum of the second type of weighted values for the third upgrade path is calculated as wb4+wb5. Likewise, a second sum of the second type of weighted values for the fourth upgrade path is calculated as wb6+wb7. And so forth.

In a step 1530 (FIG. 15), based on the sums of the weighted values, a set of recommended upgrade paths are identified for the client devices. Each recommended upgrade path is specific to the respective device, identifies specific intermediate nodes (if applicable) representing intermediate versions of the software product that should be installed on the respective device, and is an upgrade path that minimizes risks associated with the upgrading or minimizes an estimated time associated with the upgrading (depending upon the user's selection in step 1505).

More particularly, the sums of weighted values of the first type (or second type) for each upgrade path in a particular graph are compared to each other to identify a particular upgrade path for each respective client device. For example, based on the comparison, the first upgrade path in graph 1605A may be identified as a recommended upgrade path for client 104A. The third upgrade path in graph 1605B may be identified as a recommended upgrade path for client 104B. And so forth.

Referring back now to FIG. 15, in a step 1535, a set of upgrade packages, corresponding to the recommended upgrade paths, for the client devices are created. Each upgrade package is specific to the respective client device. Each upgrade package includes a desired version of the software product, particular intermediate versions of the software product (if applicable), and a sequence indicating an order in which the particular intermediate versions should be installed on the respective client device.

For example, assuming the first upgrade path of graph 1605A (FIG. 16) is identified as the recommended upgrade path for client 104A—a first upgrade package is created. The first upgrade package includes an intermediate version of the software product (as represented by node 1610B), a desired version of the software product (as represented by node 1610C), and sequence ordering information indicating that the intermediate version (node 1610B) should be installed prior to installing the desired version (node 1610C).

Assuming the third upgrade path of graph 1605B is identified as the recommended upgrade path for client 104B—a second upgrade package is created. The second upgrade package includes an intermediate version of the software product (as represented by node 1610E), the desired version of the software product (as represented by node 1610G), and sequence ordering information indicating that the intermediate version (node 1610E) should be installed prior to installing the desired version (node 1610G).

These different upgrade packages may then be provided to the user for download or otherwise be transmitted to the respective client devices. The upgrade packages are customized for each client device based on a current version of the software product installed on a particular respective client device and allow each client to be easily upgraded to the same desired version of the software product according to a most stable upgrade path or a quickest upgrade path. The different upgrade packages may be identified via an identifier of the respective client (e.g., host name, Internet Protocol (IP) address, serial number, media access control address (MAC address), or any other competent identifier).

In a specific embodiment, a method may include detecting a version of a software product that is currently installed on a computing device of a customer; prompting the customer to input a desired version of the software product to upgrade to; upon receiving the input, building a directed acyclic graph having a set of nodes, and a set of edges between the set of nodes, where the nodes represent versions of the software product, the edges represent upgrading from earlier to later versions, and the nodes include an initial node representing the currently installed version, and a final node representing the desired version; assigning weighted values of a first type to the set of edges, the weighted values of the first type indicating a degree of stability associated with upgrading from an earlier version to a later version; traversing a set of upgrade paths from the initial node to the final node to calculate sums of the weighted values of the first type for the set of upgrade paths; based on the sums of weighted values of the first type, identifying a first upgrade path, the first upgrade path including a first set of intermediate nodes between the initial and final node and corresponding to intermediate versions of the software product that are more stable as compared to other intermediate versions of the software product not on the first upgrade path; assigning weighted values of a second type to the set of edges, the weighted values of the second type indicating an estimated time associated with upgrading from the earlier version to the later version; traversing the upgrade paths from the initial node to the final node to calculate sums of the weighted values of the second type for the set of upgrade paths; based on the sums of weighted values of the second type, identifying a second upgrade path, the second upgrade path including a second set of intermediate nodes between the initial and final node and corresponding to intermediate versions of the software product having lower estimated upgrade times as compared to other intermediate versions of the software product not on the second upgrade path; allowing the customer to select one of the first or second upgrade paths; when the customer selects the first upgrade path, assembling a first upgrade package, the first upgrade package including the intermediate versions of the software product represented by the first set of intermediate nodes, the desired version, and a first installer program specifying a sequence in which the intermediate versions, represented by the first set of intermediate nodes, should be installed; and when the customer selects the second upgrade path, assembling a second upgrade package, the second upgrade package including the intermediate versions of the software product represented by the second set of intermediate nodes, the desired version, and a second installer program specifying a sequence in which the intermediate versions, represented by the second set of intermediate nodes, should be installed.

Referring back now to FIG. 10, as discussed, in a specific embodiment, a weight of each path is calculated by summing the weighted values of the edges along a particular path. This weight provides an index of the relative risk (or stability) or estimated time associated with the upgrade. It should be appreciated, however, that other mathematical operations may instead or additionally be used to calculate the weight of each path so long as the formula or calculation remains consistent for each path. In an embodiment, the upgrade path having the lowest sum of weighted values is identified as a recommended path. However, it should be appreciated that the convention may be swapped such that the upgrade path having the highest sum of weighted values is identified as a recommended path.

In another specific embodiment, the described systems and techniques may instead be applied to downgrade a software product from a later version to an earlier version.

Figure 17:
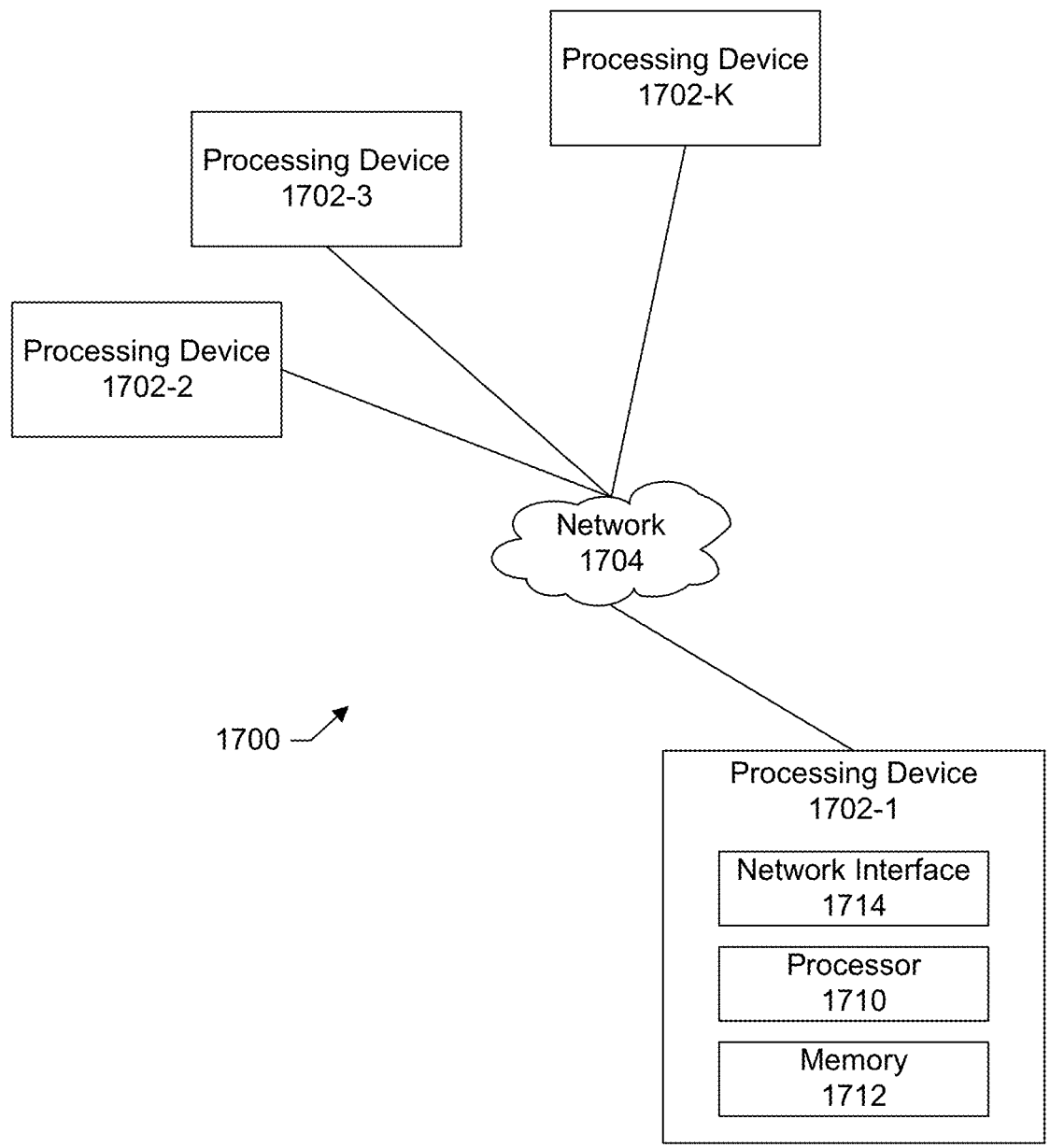
FIG. 17 shows a block diagram of a processing platform that may be utilized to implement at least a portion of an information processing system, according to one or more embodiments.

FIG. 17 shows an example of a processing platform 1700. The processing platform 1700 in this embodiment comprises a portion of system 100 and includes a plurality of processing devices, denoted 1702-1, 1702-2, 1702-3, ... 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an application-specific integrated circuit (ASIC), a field-programmable gate array (FPGA) or other type of processing circuitry, as well as portions or combinations of such circuitry elements.

The memory 1712 may comprise random access memory (RAM), read-only memory (ROM) or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 18:
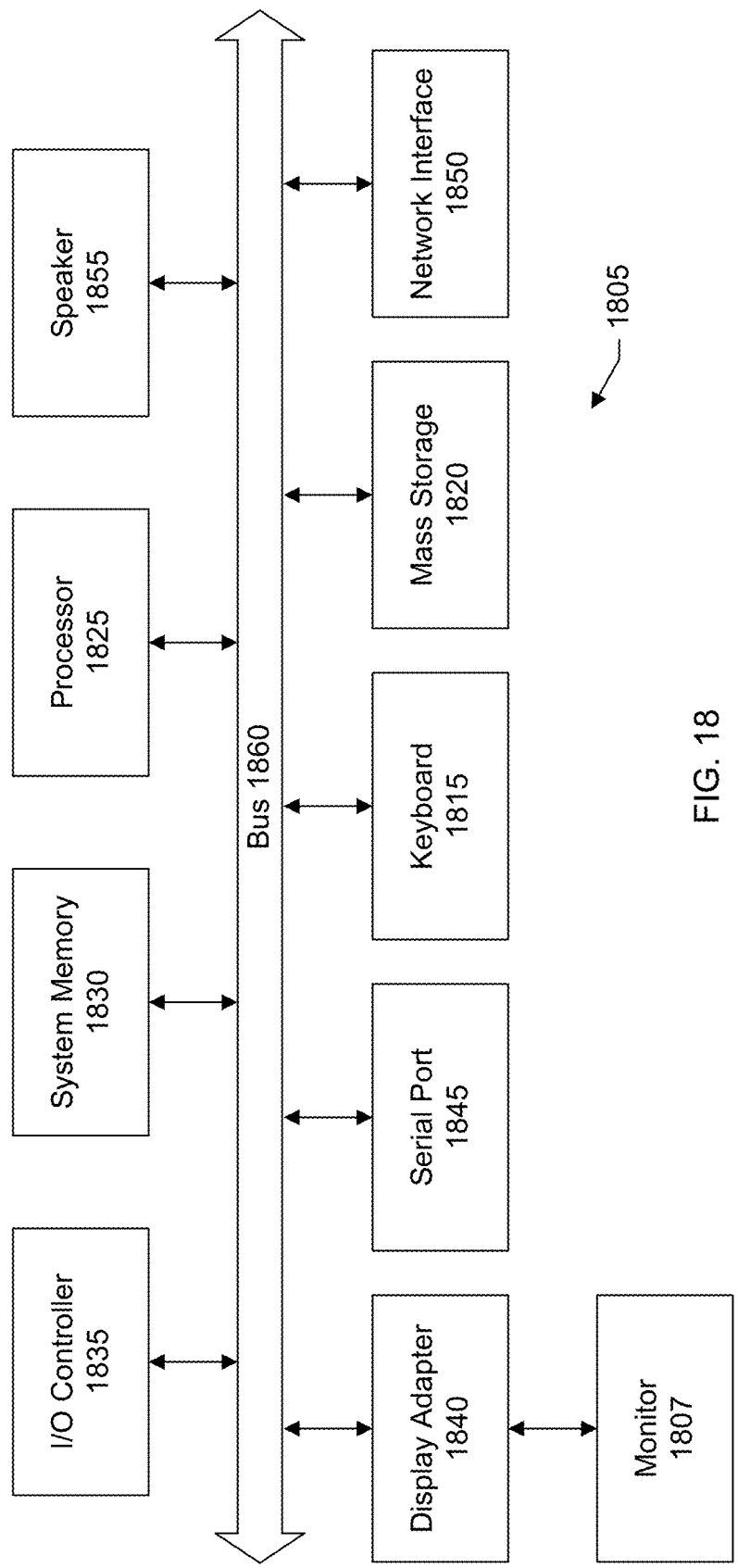
FIG. 18 shows a block diagram of a computer system suitable for use with the information processing system, according to one or more embodiments.

FIG. 18 shows a system block diagram of a computer system 1805 used to execute the software of the present system described herein. The computer system includes a monitor 1807, keyboard 1815, and mass storage devices 1820. Computer system 1805 further includes subsystems such as central processor 1825, system memory 1830, input/output (I/O) controller 1835, display adapter 1840, serial or universal serial bus (USB) port 1845, network interface 1850, and speaker 1855. The system may also be used with computer systems with additional or fewer subsystems. For example, a computer system could include more than one processor 1825 (i.e., a multiprocessor system) or a system may include a cache memory.

Arrows such as 1860 represent the system bus architecture of computer system 1805. However, these arrows are illustrative of any interconnection scheme serving to link the subsystems. For example, speaker 1855 could be connected to the other subsystems through a port or have an internal direct connection to central processor 1825. The processor may include multiple processors or a multicore processor, which may permit parallel processing of information. Computer system 1805 shown in FIG. 18 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is a system to assist a user with an upgrade of a software product installed on a server, the system comprising: a processor; and memory configured to store one or more sequences of instructions which, when executed by the processor, cause the processor to carry out the steps of: building a directed acyclic graph comprising a plurality of nodes and a plurality of edges, each node representing a version of the software product, and each edge representing an upgrade path between a pair of nodes; assigning first and second types of a plurality of weighted values to the plurality of edges, the first type of weighted value indicating a degree of stability associated with upgrading an earlier version of the software product to a later version, and the second type of weighted value indicating an estimated time required to upgrade the earlier version to the later version, the earlier version being represented by a node of the pair of nodes, and the later version being represented by another node of the pair of nodes; generating, using the first type of weighted values, a first upgrade path through the directed acyclic graph to a node representing a desired version of the software product the user wishes to upgrade to, the first upgrade path corresponding to a first upgrade plan that minimizes risks associated with upgrading to the desired version; generating, using the second type of weighted values, a second upgrade path through the directed acyclic graph to the node representing the desired version, the second upgrade path corresponding to a second upgrade plan that minimizes an estimated upgrade time associated with upgrading to the desired version; and creating an upgrade package for one of the first or second upgrade plans, the upgrade package comprising the desired version, at least a subset of intermediate versions of the software product, and a sequence indicating an order in which the intermediate versions should be installed.

In an embodiment, the processor carries out the steps of: identifying a plurality of traversal paths through the directed acyclic graph to the desired version of the software product; calculating a plurality of first weights of the first type, and a plurality of second weights of the second type for the plurality of traversal paths, each traversal path thereby being associated with a first weight of the first type, and a second weight of the second type, the first weight being a sum of the first type of weighted values assigned to a traversal path, and the second weight being a sum of the second type of weighted values assigned to the traversal path; selecting, based on the plurality of first weights of the first type, a first particular traversal path, the first particular traversal path being the first upgrade path corresponding to the first upgrade plan that minimizes risks associated with upgrading to the desired version; and selecting, based on the plurality of second weights of the second type, a second particular traversal path, the second particular traversal path being the second upgrade path corresponding to the upgrade plan that minimizes the estimated upgrade time associated with upgrading to the desired version.

In an embodiment, the processor carries out the steps of: prompting the user to select one of the first or second upgrade paths, the creation of the upgrade package being responsive to the user selection of the first or second upgrade path.

In an embodiment, the processor carries out the steps of: prompting the user to select the desired version of the software product the user wishes to upgrade to; and setting a last node of the directed acyclic graph to represent the desired version.

In an embodiment, the processor carries out the steps of: detecting a current version of the software product installed on the server; and setting an initial node of the directed acyclic graph to represent the current version.

In an embodiment, an estimated upgrade time associated with the first upgrade plan is greater than an estimated upgrade time associated with the second upgrade plan.

In another specific embodiment, there is a system comprising: a processor; and memory configured to store one or more sequences of instructions which, when executed by the processor, cause the processor to carry out the steps of: detecting versions of a software product currently installed on a plurality of clients, at least a subset of the clients having different versions of the software product; building a plurality of directed acyclic graphs for the clients, each graph being specific to a client based on a particular version of the software product that is currently installed on the client, and each graph having a plurality of nodes and a plurality of edges between the nodes, the nodes representing versions of the software product, and the edges representing upgrading from earlier to later versions of the software product; assigning weighted values to the edges in each graph, the weighted values indicating at least one of a degree of stability associated with upgrading from the earlier to later versions, or an estimated time associated with the upgrading; traversing a plurality of upgrade paths present in each graph to calculate sums of the weighted values; based on the sums of the weighted values, identifying a plurality of recommended upgrade paths for the clients, each recommended upgrade path being specific to a respective client, and identifying a set of intermediate nodes representing intermediate versions of the software product that should be installed on the respective client; and creating a plurality of upgrade packages, corresponding to the recommended upgrade paths, for the clients, wherein each upgrade package is specific to the respective client, and comprises the desired version of the software product, particular intermediate versions of the software product based on the particular version of the software product that is currently installed on the respective client, and a sequence indicating an order in which the particular intermediate versions should be installed on the respective client.

In an embodiment, the processor carries out the steps of: detecting that a first version of the software product is currently installed on a first client; detecting that a second version, different from the first version, of the software product is currently installed on a second client; building a first directed acyclic graph for the first client, the first directed acyclic graph comprising an initial node representing the first version of the software product, a first set of intermediate nodes representing the intermediate versions of the software product, a final node representing the desired version to upgrade to, and first edges between nodes of the first directed acyclic graph representing the upgrading from the earlier to later versions; and building a second directed acyclic graph for the second client, the second directed acyclic graph comprising an initial node representing the second version of the software product, a second set of intermediate nodes representing the intermediate versions of the software product, a final node representing the desired version to upgrade to, and second edges between nodes of the second directed acyclic graph representing the upgrading from the earlier to later versions.

In an embodiment, the processor carries out the steps of: assigning a first type of weighted values to the edges in the first and second directed acyclic graphs, the first type of weighted values indicating the degree of stability associated with the upgrading; traversing a first plurality of upgrade paths present in the first directed acyclic graph to calculate sums of the first type of weighted values in the first directed acyclic graph; identifying a first recommended upgrade path from the first plurality of upgrade paths based on the sums of the first type of weighted values in the first directed acyclic graph; traversing a second plurality of upgrade paths present in the second directed acyclic graph to calculate sums of the first type of weighted values in the second directed acyclic graph; identifying a second recommended upgrade path from the second plurality of upgrade paths based on the sums of the first type of weighted values in the second directed acyclic graph; creating a first upgrade package, corresponding to the first recommended upgrade path, for the first client; and creating a second upgrade package, corresponding to the second recommended upgrade path, for the second client, wherein the second upgrade package is different from the first upgrade package.

In an embodiment, the processor carries out the steps of: assigning a second type of weighted values to the edges in the first and second directed acyclic graphs, the second type of weighted values indicating an estimated amount of time associated with the upgrading; traversing a first plurality of upgrade paths present in the first directed acyclic graph to calculate sums of the second type of weighted values in the first directed acyclic graph; identifying a first recommended upgrade path from the first plurality of upgrade paths based on the sums of the second type of weighted values in the first directed acyclic graph; traversing a second plurality of upgrade paths present in the second directed acyclic graph to calculate sums of the second type of weighted values in the second directed acyclic graph; identifying a second recommended upgrade path from the second plurality of upgrade paths based on the sums of the second type of weighted values in the second directed acyclic graph; creating a first upgrade package, corresponding to the first recommended upgrade path, for the first client; and creating a second upgrade package, corresponding to the second recommended upgrade path, for the second client, wherein the second upgrade package is different from the first upgrade package.

In an embodiment, the processor carries out the steps of: prompting a user to input the desired version of the software product each client should be upgraded to.

In an embodiment, the processor carries out the steps of: prompting a user to select one of upgrading each client using an upgrade plan that minimizes risk associated with upgrading the software product or upgrading each client using an upgrade plan that minimizes upgrade time.

In an embodiment, the plurality of directed acyclic graphs comprises a first graph for a first client, and a second graph for a second client, wherein the first graph comprises a first upgrade path from a first initial node to a first final node, the first initial node represents a version of the software product currently installed on the first client, and the first final node represents the desired version of the software product the first client is to be upgraded to, wherein the second graph comprises a second upgrade path from a second initial node to a second final node, the second initial node represents a version of the software product currently installed on the second client, and the second final node represents the desired version of the software product the second client is to be upgraded to, wherein the version of the software product currently installed on the first client is different from the version of the software product currently installed on the second client, and wherein the desired version of the software product the first client is to be upgraded to and the desired version of the software product the second client is to be upgraded to are the same.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system for upgrading a software product installed on a server, the system comprising: a processor; and memory configured to store one or more sequences of instructions which, when executed by the processor, cause the processor to carry out the steps of:
building a directed acyclic graph comprising a plurality of nodes and a plurality of edges, each node representing a version of the software product, and each edge representing an upgrade path between a pair of nodes;
assigning first and second types of a plurality of weighted values to the plurality of edges, the first type of weighted value indicating a level of risk associated with upgrading an earlier version of the software product to a later version, and the second type of weighted value indicating an estimated time required to upgrade the earlier version to the later version, the earlier version being represented by a node of the pair of nodes, and the later version being represented by another node of the pair of nodes;
generating, using the first type of weighted values, a first upgrade path through the directed acyclic graph to a node representing a desired version of the software product a user wishes to upgrade to, the first upgrade path corresponding to a first upgrade plan that minimizes risks associated with upgrading to the desired version;
generating, using the second type of weighted values, a second upgrade path through the directed acyclic graph to the node representing the desired version, the second upgrade path corresponding to a second upgrade plan that minimizes an estimated upgrade time associated with upgrading to the desired version;
creating an upgrade package for one of the first or second upgrade plans, the upgrade package comprising the desired version, at least a subset of intermediate versions of the software product, and a sequence indicating an order in which the intermediate versions should be installed;
identifying a plurality of traversal paths through the directed acyclic graph to the desired version of the software product;
calculating a plurality of first weighted values of the first type, and a plurality of second weighted values of the second type for the plurality of traversal paths, each traversal path thereby being associated with a first weighted value of the first type, and a second weighted value of the second type, the first weighted value being a sum of the first type of weighted values assigned to a traversal path, and the second weighted value being a sum of the second type of weighted values assigned to the traversal path;
selecting, based on the plurality of first weighted values of the first type, a first particular traversal path, the first particular traversal path being the first upgrade path corresponding to the first upgrade plan that minimizes risks associated with upgrading to the desired version; and
selecting, based on the plurality of second weighted values of the second type, a second particular traversal path, the second particular traversal path being the second upgrade path corresponding to the upgrade plan that minimizes the estimated upgrade time associated with upgrading to the desired version.

2. The system of claim 1 wherein the processor carries out the steps of:
prompting the user to select one of the first or second upgrade paths, the creation of the upgrade package being responsive to the user selection of the first or second upgrade path.

3. The system of claim 1 wherein the processor carries out the steps of:
prompting the user to select the desired version of the software product the user wishes to upgrade to; and
setting a last node of the directed acyclic graph to represent the desired version.

4. The system of claim 1 wherein the processor carries out the steps of:
detecting a current version of the software product installed on the server; and
setting an initial node of the directed acyclic graph to represent the current version.

5. A method of upgrading a software product installed on a server comprising:

building a directed acyclic graph comprising a plurality of nodes and a plurality of edges, each node representing a version of the software product, and each edge representing an upgrade path between a pair of nodes;

assigning first and second types of a plurality of weighted values to the plurality of edges, the first type of weighted value indicating a level of risk associated with upgrading an earlier version of the software product to a later version, and the second type of weighted value indicating an estimated time required to upgrade the earlier version to the later version, the earlier version being represented by a node of the pair of nodes, and the later version being represented by another node of the pair of nodes;

generating, using the first type of weighted values, a first upgrade path through the directed acyclic graph to a node representing a desired version of the software product a user wishes to upgrade to, the first upgrade path corresponding to a first upgrade plan that minimizes risks associated with upgrading to the desired version;

generating, using the second type of weighted values, a second upgrade path through the directed acyclic graph to the node representing the desired version, the second upgrade path corresponding to a second upgrade plan that minimizes an estimated upgrade time associated with upgrading to the desired version;

creating an upgrade package for one of the first or second upgrade plans, the upgrade package comprising the desired version, at least a subset of intermediate versions of the software product, and a sequence indicating an order in which the intermediate versions should be installed;

identifying a plurality of traversal paths through the directed acyclic graph to the desired version of the software product;

calculating a plurality of first weighted values of the first type, and a plurality of second weighted values of the second type for the plurality of traversal paths, each traversal path thereby being associated with a first weighted value of the first type, and a second weighted value of the second type, the first weighted value being a sum of the first type of weighted values assigned to a traversal path, and the second weighted value being a sum of the second type of weighted values assigned to the traversal path;

selecting, based on the plurality of first weighted values of the first type, a first particular traversal path, the first particular traversal path being the first upgrade path corresponding to the first upgrade plan that minimizes risks associated with upgrading to the desired version; and selecting, based on the plurality of second weighted values of the second type, a second particular traversal path, the second particular traversal path being the second upgrade path corresponding to the upgrade plan that minimizes the estimated upgrade time associated with upgrading to the desired version.

6. The method of claim 5 comprising:
prompting the user to select one of the first or second upgrade paths, the creation of the upgrade package being responsive to the user selection of the first or second upgrade path.

7. The method of claim 5 comprising:
prompting the user to select the desired version of the software product the user wishes to upgrade to; and setting a last node of the directed acyclic graph to represent the desired version.

8. The method of claim 5 comprising:
detecting a current version of the software product installed on the server; and
setting an initial node of the directed acyclic graph to represent the current version.

9. A computer program product, comprising a non-transitory computer-readable medium having a computer-readable program code embodied therein, the computer-readable program code adapted to be executed by one or more processors to implement a method of upgrading a software product installed on a server, the method comprising:

building a directed acyclic graph comprising a plurality of nodes and a plurality of edges, each node representing a version of the software product, and each edge representing an upgrade path between a pair of nodes;

assigning first and second types of a plurality of weighted values to the plurality of edges, the first type of weighted value indicating a level of risk associated with upgrading an earlier version of the software product to a later version, and the second type of weighted value indicating an estimated time required to upgrade the earlier version to the later version, the earlier version being represented by a node of the pair of nodes, and the later version being represented by another node of the pair of nodes;

generating, using the first type of weighted values, a first upgrade path through the directed acyclic graph to a node representing a desired version of the software product a user wishes to upgrade to, the first upgrade path corresponding to a first upgrade plan that minimizes risks associated with upgrading to the desired version;

generating, using the second type of weighted values, a second upgrade path through the directed acyclic graph to the node representing the desired version, the second upgrade path corresponding to a second upgrade plan that minimizes an estimated upgrade time associated with upgrading to the desired version;

creating an upgrade package for one of the first or second upgrade plans, the upgrade package comprising the desired version, at least a subset of intermediate versions of the software product, and a sequence indicating an order in which the intermediate versions should be installed;

identifying a plurality of traversal paths through the directed acyclic graph to the desired version of the software product;

calculating a plurality of first weighted values of the first type, and a plurality of second weighted values of the second type for the plurality of traversal paths, each traversal path thereby being associated with a first weighted value of the first type, and a second weighted value of the second type, the first weighted value being a sum of the first type of weighted values assigned to a traversal path, and the second weighted value being a sum of the second type of weighted values assigned to the traversal path;

selecting, based on the plurality of first weighted values of the first type, a first particular traversal path, the first particular traversal path being the first upgrade path corresponding to the first upgrade plan that minimizes risks associated with upgrading to the desired version; and selecting, based on the plurality of second weighted values of the second type, a second particular traversal path, the second particular traversal path being the second upgrade path corresponding to the upgrade plan that minimizes the estimated upgrade time associated with upgrading to the desired version.

10. The computer program product of claim 9 wherein the method comprises:
prompting the user to select one of the first or second upgrade paths, the creation of the upgrade package being responsive to the user selection of the first or second upgrade path.

11. The computer program product of claim 9 wherein the method comprises:
prompting the user to select the desired version of the software product the user wishes to upgrade to; and
setting a last node of the directed acyclic graph to represent the desired version.

12. The computer program product of claim 9 wherein the method comprises:
detecting a current version of the software product installed on the server; and
setting an initial node of the directed acyclic graph to represent the current version.

* * * * *